(12) United States Patent
Komatsu et al.

(10) Patent No.: US 10,027,234 B2
(45) Date of Patent: Jul. 17, 2018

(54) POWER CONVERSION DEVICE FOR PERFORMING POWER CONVERSION BETWEEN DC AND DC BY CONTROLLING SWITCHING OF A SEMICONDUCTOR SWITCHING ELEMENT

(71) Applicant: Mitsubishi Electric Corporation, Chiyoda-ku (JP)

(72) Inventors: Yuta Komatsu, Chiyoda-ku (JP); Ryota Kondo, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/568,041

(22) PCT Filed: May 24, 2016

(86) PCT No.: PCT/JP2016/065357
§ 371 (c)(1),
(2) Date: Oct. 20, 2017

(87) PCT Pub. No.: WO2017/018038
PCT Pub. Date: Feb. 2, 2017

(65) Prior Publication Data
US 2018/0145601 A1 May 24, 2018

(30) Foreign Application Priority Data
Jul. 24, 2015 (JP) .................................. 2015-146559

(51) Int. Cl.
*H02J 3/12* (2006.01)
*G05F 1/00* (2006.01)
(Continued)

(52) U.S. Cl.
CPC ..... *H02M 3/33584* (2013.01); *B60L 11/1868* (2013.01); *H02J 1/108* (2013.01);
(Continued)

(58) Field of Classification Search
CPC .................. H02M 2001/0048; H02M 1/15
(Continued)

(56) References Cited

U.S. PATENT DOCUMENTS 7,129,685 B2 * 10/2006 Nakai ................. H02M 3/1588
323/285
2012/0126764 A1 * 5/2012 Urakabe ................. H02M 3/07
323/282
(Continued)

FOREIGN PATENT DOCUMENTS

JP 59-2567 A 1/1984
JP 2002-158448 A 5/2002
(Continued)

OTHER PUBLICATIONS

International Search Report dated Aug. 9, 2016 in PCT/JP2016/065357 filed May 24, 2016.
(Continued)

*Primary Examiner* — Gary Nash
(74) *Attorney, Agent, or Firm* — Oblon, McClelland, Maier & Neustadt, L.L.P.

(57) ABSTRACT

A power conversion device includes switching elements, a reactor, and capacitors in each of which plural capacitor elements are connected in parallel to each other. Then, a carrier frequency used for controlling switching of the switching elements is set so that it is less than series resonance frequencies of all of the capacitor elements in the capacitors, and integer multiples of that frequency are each not equal to a parallel resonance frequency.

20 Claims, 24 Drawing Sheets

(51) Int. Cl.
*H02J 1/02* (2006.01)
*H02M 1/12* (2006.01)
*H02M 1/14* (2006.01)
*H02M 7/00* (2006.01)
*H02M 3/335* (2006.01)
*H02M 3/158* (2006.01)
*H02M 3/157* (2006.01)
*B60L 11/18* (2006.01)
*H02M 7/537* (2006.01)
*H02J 1/10* (2006.01)
*H02M 1/00* (2006.01)

(52) U.S. Cl.
CPC ........... *H02M 3/157* (2013.01); *H02M 3/158* (2013.01); *H02M 7/537* (2013.01); *H02M 2001/0048* (2013.01)

(58) Field of Classification Search
USPC .................. 323/242, 243, 284, 285, 288
See application file for complete search history.

(56) References Cited

U.S. PATENT DOCUMENTS

| 2012/0194152 A1* | 8/2012 | Martinelli | H02M 3/158 323/282 |
| 2013/0002215 A1* | 1/2013 | Ikeda | H02M 3/158 323/271 |
| 2013/0021011 A1* | 1/2013 | Okuda | H02M 3/158 323/282 |
| 2013/0099768 A1 | 4/2013 | Yonezawa et al. | |
| 2013/0119961 A1* | 5/2013 | Okuda | H02M 3/158 323/299 |
| 2013/0311026 A1* | 11/2013 | Endo | B60L 3/0046 701/22 |
| 2014/0111172 A1 | 4/2014 | Sasao et al. | |

FOREIGN PATENT DOCUMENTS

| JP | 2010-115056 A | 5/2010 |
| JP | 2012-79757 A | 4/2012 |
| JP | 2013-93970 A | 5/2013 |
| JP | 5457559 B2 | 4/2014 |
| JP | 2014-87185 A | 5/2014 |
| JP | 2014-212687 A | 11/2014 |
| WO | WO 2011/016199 A1 | 2/2011 |

OTHER PUBLICATIONS

Office Action dated Nov. 7, 2017 in Japanese Patent Application No. 2017-531050 (with English language translation).

* cited by examiner

4a

POWER CONVERSION DEVICE FOR PERFORMING POWER CONVERSION BETWEEN DC AND DC BY CONTROLLING SWITCHING OF A SEMICONDUCTOR SWITCHING ELEMENT

TECHNICAL FIELD

The present invention relates to a power conversion device for performing power conversion between DC and DC by controlling switching of a semiconductor switching element.

BACKGROUND ART

In motor-driven vehicles as exemplified by an EV (Electric Vehicle) and an HEV (Hybrid Electric Vehicle), power conversion devices are used each including, for example, a high voltage battery, a bidirectional converter, a smoothing capacitor, and an inverter. At the time of powering operation, the power of the high-voltage battery is stepped up by the bidirectional converter, so that DC power is supplied to the inverter, and then AC power converted in the inverter is supplied to a motor. Meanwhile, at the time of regenerative operation, the motor is operated as a power generator, so that DC power converted in the inverter is stepped down by the bidirectional converter and then the DC power is charged in the high-voltage battery. A variety of systems have been disclosed as power conversion devices applicable with the bidirectional converter.

A conventional chopper device as the power conversion device controls switching of a semiconductor switch connected between a DC power source and a load, to thereby output a DC voltage that is different to an input DC voltage. The chopper device includes: a voltage-error amplifier circuit for outputting a signal that is proportional to a deviation between a detection value of the output voltage of the chopper device and a preset value thereof; a conduction-time calculation circuit for calculating the conduction time of the semiconductor switch, proportionally to an input signal; a switching-command circuit, to which the output of the conduction-time calculation circuit is applied, for controlling switching of the semiconductor switch; and a conduction-time correction circuit provided between the error amplifier circuit and the conduction-time calculation circuit, for applying a correction signal to the conduction-time calculation circuit so that a ratio of the DC output voltage relative to the DC input voltage is proportional to the output signal of the voltage-error amplifier circuit (see, for example, Patent Document 1).

It is noted that, replacing the diode in the chopper device with a semiconductor switch makes possible bidirectional power conversion.

Further, a chopper circuit not including, on other than its input/output sides, any electricity storage element related to stepping up/down, but performing power conversion between a low-voltage side and a high-voltage side, like the above chopper device, will hereinafter be referred to as an SPC (Single Phase Chopper) circuit.

As a control method of the SPC circuit, there is disclosed a method of: performing PI (proportional-integral) control so that a difference between a target voltage and a voltage on the load device-side becomes smaller; and performing PWM (Pulse Width Modulation) control on two switching elements included in a bidirectional converter, irrespective of the stepping-up operation or the stepping-down operation (see, for example, Patent Document 2).

Meanwhile, as another conventional power conversion device, there is a device as described below.

The power conversion device has: multiple terminals; a reactor; a switching-element series circuit; a charging/discharging capacitor; and a smoothing capacitor. The multiple terminals has first, second, third and fourth terminals, and the switching-element series circuit comprises first, second, third and fourth switching elements connected in series to each other. The connection point between the second and third switching elements is connected through the reactor to the first terminal; the first switching element is connected, at its side opposite to its connection point with the second switching element, to the second terminal; the charging/discharging capacitor is connected between the connection point between the first and second switching elements and the connection point between third and fourth switching elements; the smoothing capacitor is connected in parallel to the switching-element series circuit; and the switching-element series circuit is connected to the third and fourth terminals. The first and second terminals are placed on a low-voltage side, and the third and fourth terminals are placed on a high-voltage side, so that DC voltage conversion is performed between the low-voltage side and the high-voltage side (see, for example, Patent Document 3).

It is noted that a chopper circuit including a charging/discharging capacitor on other than its input/output sides, and performing power conversion between a low-voltage side and a high-voltage side, like the above power conversion device, will hereinafter be referred to as an MLC (Multi Level Chopper) circuit.

On the other hand, for the purpose of high-power application, the capacitor used in the power conversion device is generally configured with plural capacitor elements that are connected in parallel to each other. It is known that, when the capacitor elements are connected in parallel to each other, parallel resonance by which the impedance becomes larger occurs among the series resonance frequencies of the respective capacitor elements. At the parallel resonance point, the impedance and the ESR (Equivalent Series Resistance) are likely to increase and thus, a circulation current flows inside the capacitor, so that abnormal heating is likely to occur (see, for example, Patent Document 4).

CITATION LIST

Patent Document

Patent Document 1: Japanese Patent Application Laid-open No. S59-2567
Patent Document 2: Japanese Patent Application Laid-open No. 2010-115056
Patent Document 3: Japanese Patent No. 5457559
Patent Document 4: Japanese Patent Application Laid-open No. 2012-79757

SUMMARY OF THE INVENTION

Problems to be Solved by the Invention

When the capacitor in which plural capacitor elements are connected in parallel to each other is used as a capacitor in the conventional power conversion device as described above, the impedance and the ESR are likely to increase at the parallel resonance point, so that abnormal heating is likely to occur. Further, in the current flowing through the capacitor, many harmonic components are included other than the fundamental-wave component based on the switching frequency, so that, if the frequency of the harmonic component is matched nearly to the parallel resonance frequency, the loss in the capacitor increases, and this may also result in abnormal heating.

In addition, when the capacity of the capacitor is increased or its cooling structure is expanded in order to suppress temperature rise of the capacitor, this will result in enlarged device configuration or increased cost.

This invention has been made to solve the problem as described above, and an object thereof is—with respect to the power conversion device that uses a capacitor in which plural capacitor elements are connected in parallel to each other and that performs power conversion between DC and DC—to reduce the loss due to parallel resonance of the capacitor to thereby suppress temperature rise of the capacitor, and to achieve downsizing of the device configuration and cost reduction.

Means for Solving the Problems

A power conversion device according to the invention comprises: a DC/DC converter having plural semiconductor elements to be rendered conductive or cut off, a reactor, and plural capacitors in each of which plural capacitor elements are connected in parallel to each other; and a control circuit for controlling the DC/DC converter. At least a part of the plural semiconductor elements comprises a switching element(s), and the control circuit controls driving of the switching element(s) at a preset frequency. And, the preset frequency is less than series resonance frequencies of all of the plural capacitor elements in the plural capacitors, and is lower than a value (fp/N) that is resulting from dividing a parallel resonance frequency fp of the plural capacitor elements in a first capacitor as one of the plural capacitors, by an order N that is determined based on harmonic currents flowing through the first capacitor, and further, integer multiples of the preset frequency are each not equal to the parallel resonance frequency fp.

Effect of the Invention

According to the power conversion device of the invention, it is possible to reduce the loss due to parallel resonance of the capacitor, thereby to improve the power conversion efficiency and further to suppress temperature rise of the capacitor. In addition, this makes it possible to accomplish downsizing of the device configuration and cost reduction.

MODES FOR CARRYING OUT THE INVENTION

Embodiment 1

Hereinafter, a power conversion device according to Embodiment 1 of the invention will be described based on drawings as follows.

Figure 1:
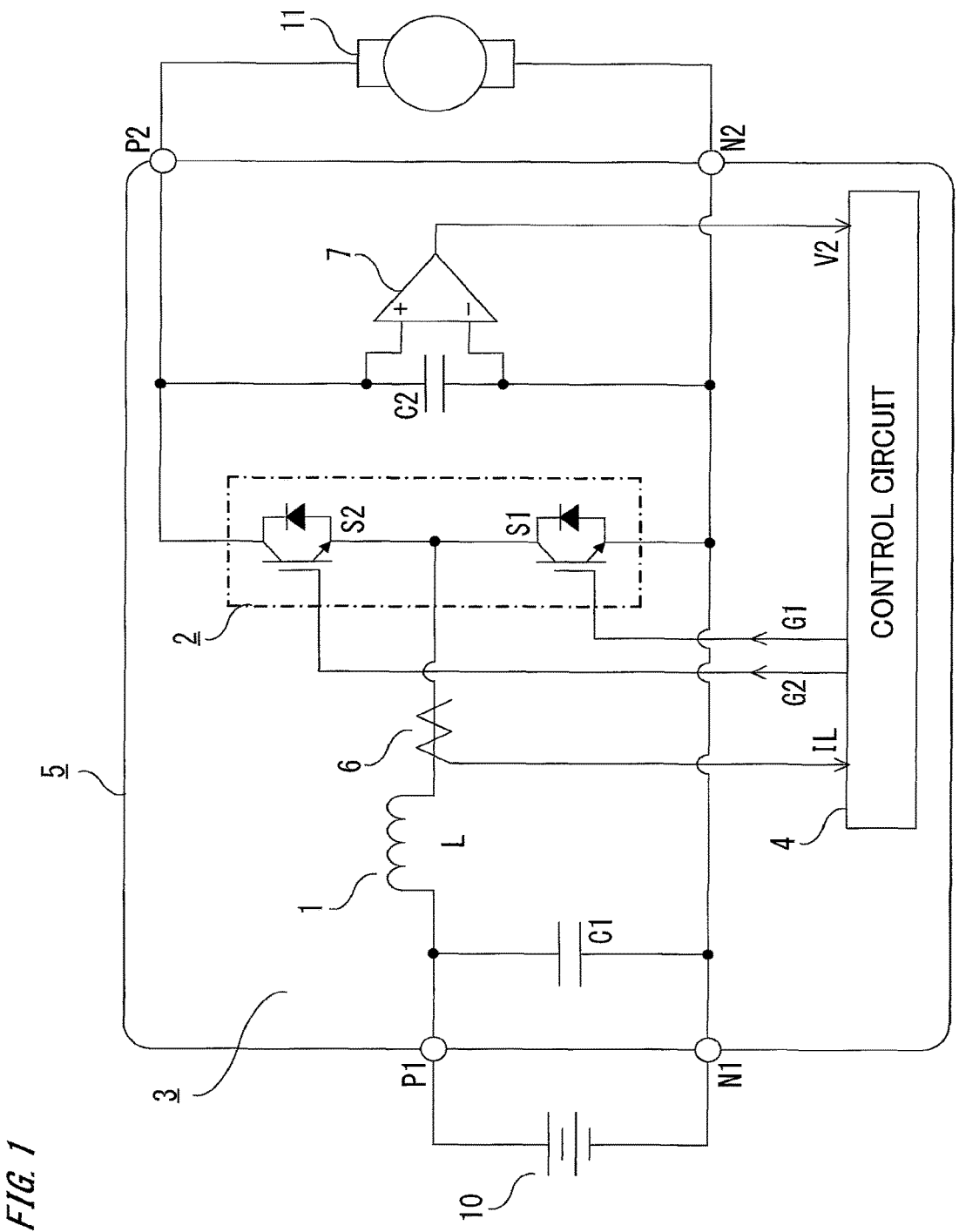
FIG. 1 is a diagram showing a circuit configuration of a power conversion device according to Embodiment 1 of the invention.

FIG. 1 is a diagram showing a circuit configuration of the power conversion device according to Embodiment 1 of the invention. As shown in FIG. 1, a power conversion device 5 includes a DC/DC converter 3 as a main circuit, and a control circuit 4 for controlling the DC/DC converter 3. The DC/DC converter 3 includes: a reactor 1; a semiconductor module 2 comprising a switching element S1 as a first semiconductor element, and a switching element S2 as a second semiconductor element; a low-voltage side capacitor C1; and a high-voltage side capacitor C2 as a first capacitor. Further, there are provided a current sensor 6 and a voltage sensor 7. The control circuit 4 controls driving of the switching elements S1, S2, based on the detection values from the sensors 6, 7.

Further, a high-voltage battery 10 is connected to the low-voltage side (between P1 and N1) and an electric motor 11 is connected to the high-voltage side (between P2 and N2) of the DC/DC converter 3. Note that the respective switching elements S1, S2 are each composed of, for example, an IGBT (Insulated Gate Bipolar Transistor) and a diode connected in reverse parallel thereto.

The power conversion device 5 is an SPC circuit of a bidirectional type capable of converting power bidirectionally between the low-voltage side and the high-voltage side, and serves to step up an input voltage (low-voltage side voltage) V1 inputted between P1 and N1 as low-voltage side terminals, to a voltage higher than V1 and then to output between P2 and N2 as high-voltage side terminals, an output voltage (high-voltage side voltage) V2 after stepped up. The switching element S1 is connected at its one end (first end) to the negative-side terminal of the low-voltage side capacitor C1, and connected at the other end (second end), through the reactor 1, to the positive-side terminal of the low-voltage side capacitor C1. The switching element S2 is connected at its one end (first end) to the second end of the switching element S1, and connected at the other end (second end) to the positive-side terminal of the high-voltage side capacitor C2.

The low-voltage side capacitor C1 smooths the input voltage V1. The reactor 1 is used for energy storage, and the semiconductor module 2 steps up the input voltage V1 to the output voltage V2. On this occasion, the switching elements S1, S2 in the semiconductor module 2 are turned ON when gate signals G1, G2 outputted by the control circuit 4 are High, respectively.

The current sensor 6 detects a reactor current IL flowing through the reactor 1. The voltage sensor 7 detects a voltage between the terminals of the high-voltage side capacitor C2, as the output voltage V2 (high-voltage side voltage). The high-voltage side capacitor C2 smooths the output voltage V2.

The control circuit 4 generates the gate signals G1, G2 for the respective switching elements S1, S2, according to a detection value (IL) of the current sensor 6 and a detection value (V2) of the voltage sensor 7, to thereby cause each of the switching elements S1, S2 to perform ON/OFF operation.

Figure 2:
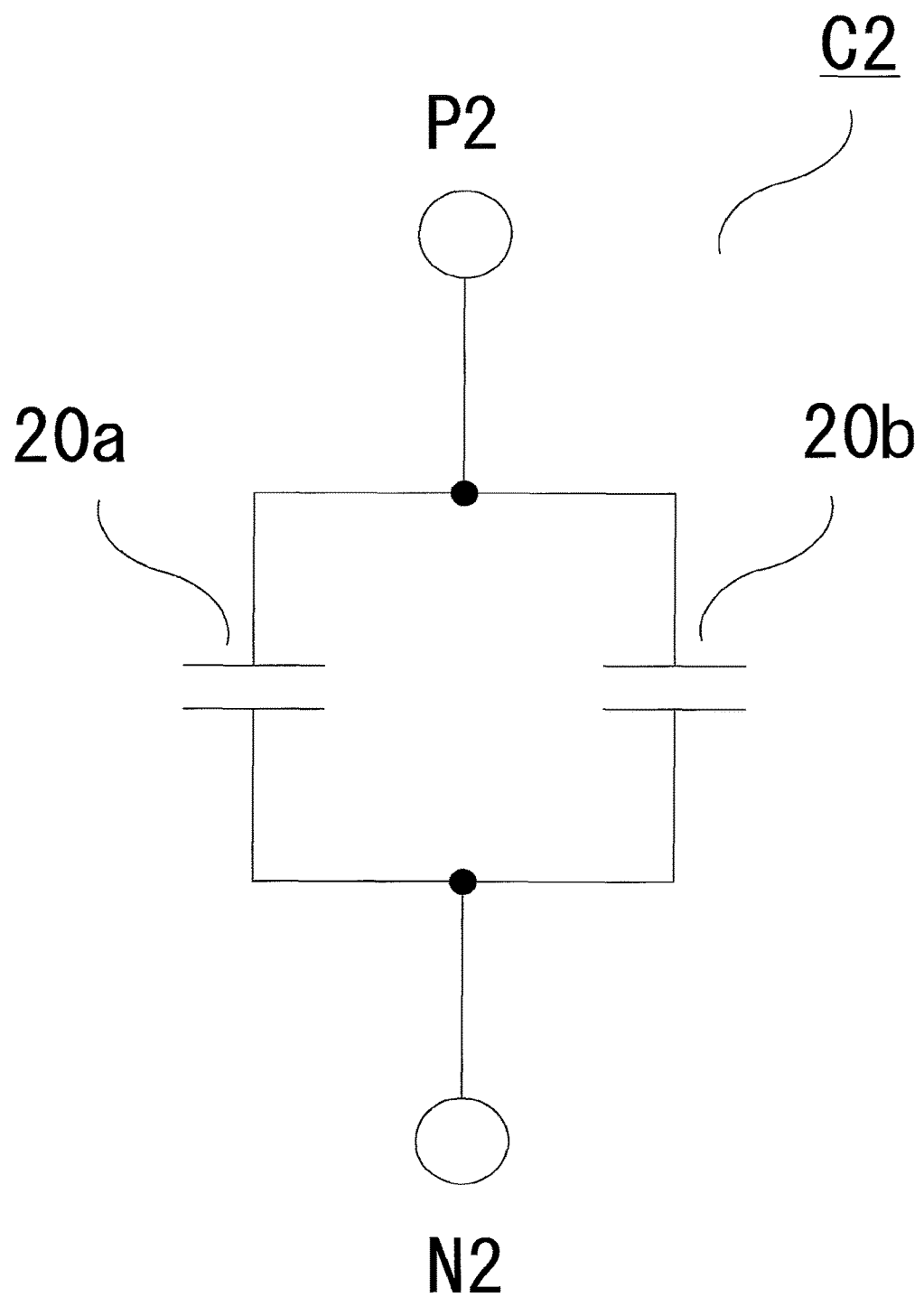
FIG. 2 is a circuit diagram for illustrating a high-voltage side capacitor according to Embodiment 1 of the invention.
Figure 3:
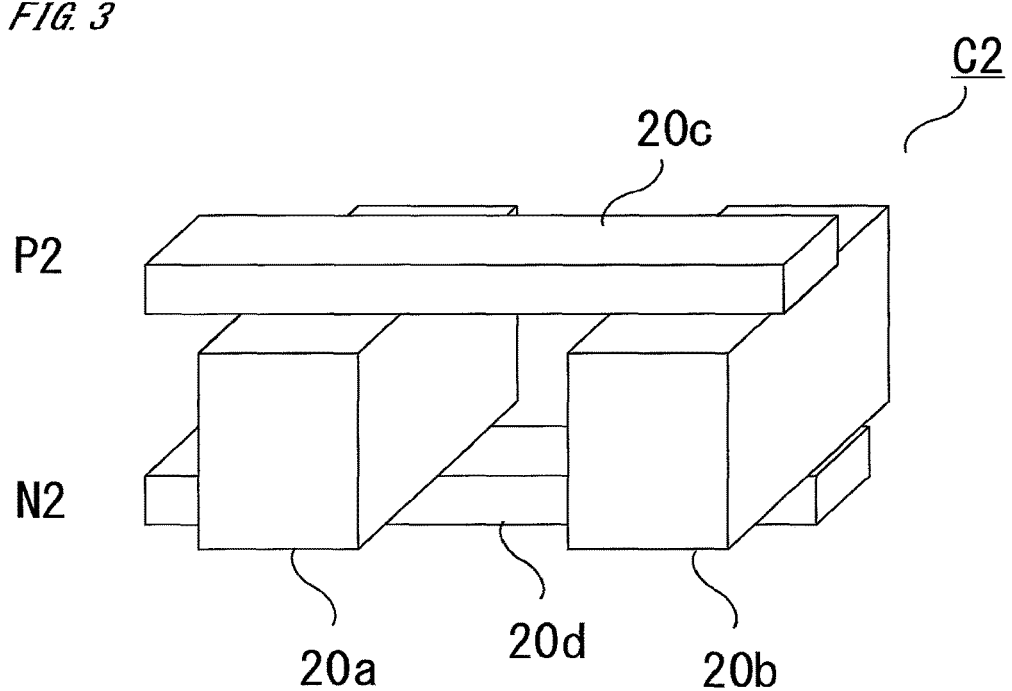
FIG. 3 is a structure diagram of the high-voltage side capacitor according to Embodiment 1 of the invention.

FIG. 2 and FIG. 3 are diagrams showing the configuration of the high-voltage side capacitor C2, and in particular, FIG. 2 is a circuit diagram and FIG. 3 is a structure diagram.

As shown in FIG. 2, the high-voltage side capacitor C2 is configured with a first capacitor element 20a and a second capacitor element 20b that are given as plural capacitors elements having the same characteristics and are connected in parallel to each other. Further, as shown in FIG. 3, the first capacitor element 20a and the second capacitor element 20b are connected in parallel to each other using a first bus bar 20c and a second bus bar 20d, so that the high-voltage side capacitor C2 is configured and is connected between the high-voltage side terminals, i.e. between P2 and N2.

Further, though not illustrated, the first and second capacitor elements 20a, 20b and the first and second bus bars 20c, 20d are accommodated in a casing made from a PPS (Polyphenylene Sulfide) resin, etc., and an epoxy resin, etc. is filled therein, so that the high-voltage side capacitor C2 is constructed.

It is noted that the low-voltage side capacitor C1 has a similar configuration and thus, it is configured with plural capacitor elements that are connected in parallel to each other, and in this case, it is connected between the low-voltage side terminals, i.e. between P1 and N1.

Figure 4:
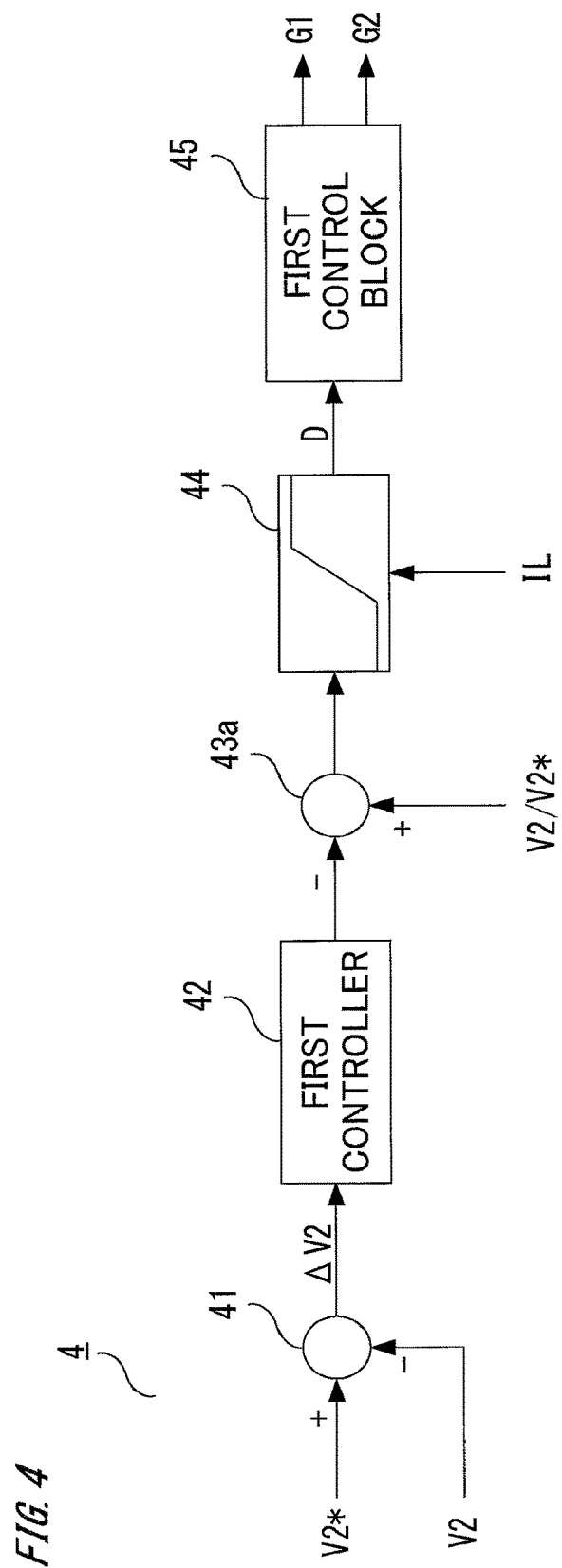
FIG. 4 is a control block diagram of the power conversion device according to Embodiment 1 of the invention.

FIG. 4 is a control block diagram of the control circuit 4. As shown in FIG. 4, the control circuit 4 has a subtractor 41, a first controller 42, a subtractor 43a, a limiter 44 and a first control block 45.

Figure 5:
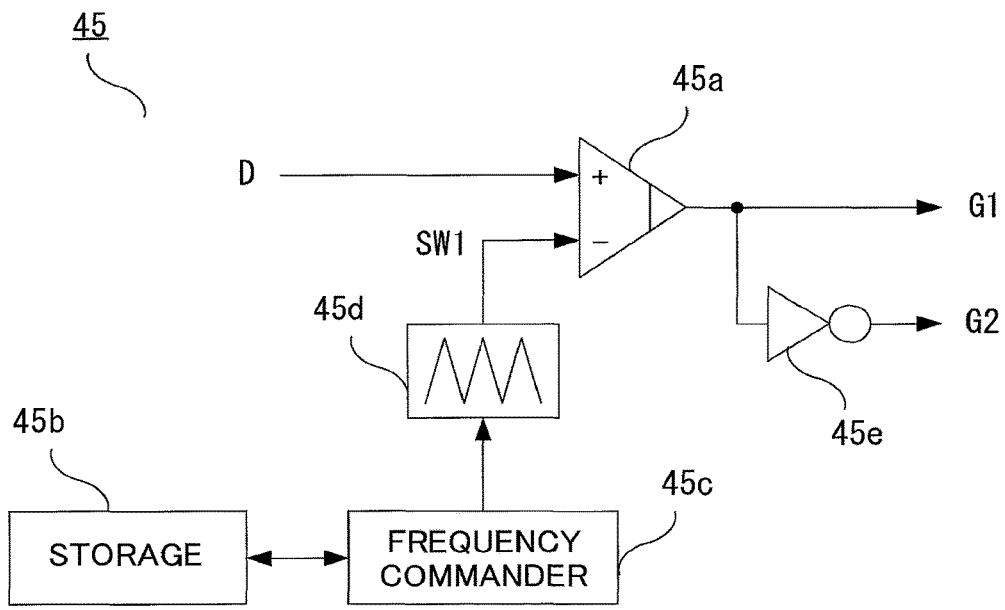
FIG. 5 is a block diagram showing details of a first control block according to Embodiment 1 of the invention.

Further, details of the first control block 45 are shown in FIG. 5. As shown in FIG. 5, the first control block 45 has a comparator 45a, storage 45b, a frequency commander 45c, a carrier signal generator 45d and an inverter 45e. Note that, in the storage 45b, a carrier frequency fsw as a preset frequency is stored.

Operations of the control circuit 4, namely, how to control the DC/DC converter 3 will be described based on FIG. 4 and FIG. 5, as follows.

An output-voltage target value V2* that is a command value of the high-voltage side voltage, and the detected output voltage V2, are inputted to the subtractor 41, and a differential voltage ΔV2 outputted by the subtractor 41 is inputted to the first controller 42. The first controller 42 executes PI control in which a proportional operation and an integral operation are combined. The subtractor 43a subtracts an output coming from the first controller 42, from a value (V2/V2*) that is an inverse of the theoretical boost ratio of the DC/DC converter 3, to thereby output a duty ratio D that is a conduction rate of the switching element S1. Upon detect ion that the value of the detected reactor current IL has changed from negative to positive, namely, upon detection that the reactor current IL has crossed zero, the limiter 44 executes limiting processing for suppressing the duty ratio D from decreasing, for a fixed period of time. Note that the limiting processing by the limiter 44 is terminated when the fixed period of time elapses.

The first control block 45 is a block for generating PWM signals (gate signals G1, G2). The frequency commander 45c refers to the carrier frequency fsw stored in the storage 45b, to thereby instruct the carrier signal generator 45d to generate a carrier signal with the frequency fsw. The carrier signal generator 45d generates a first triangular wave SW1 as the carrier signal with the frequency fsw. The duty ratio D outputted through the limiter 44 and the first triangular wave SW1 are inputted to the comparator 45a and are then mutually compared, so that the gate signal G1 for the switching element S1 is generated. Further, the inverter 45e inverts the gate signal G1 to thereby output the gate signal G2 for the switching element S2.

Figure 6:
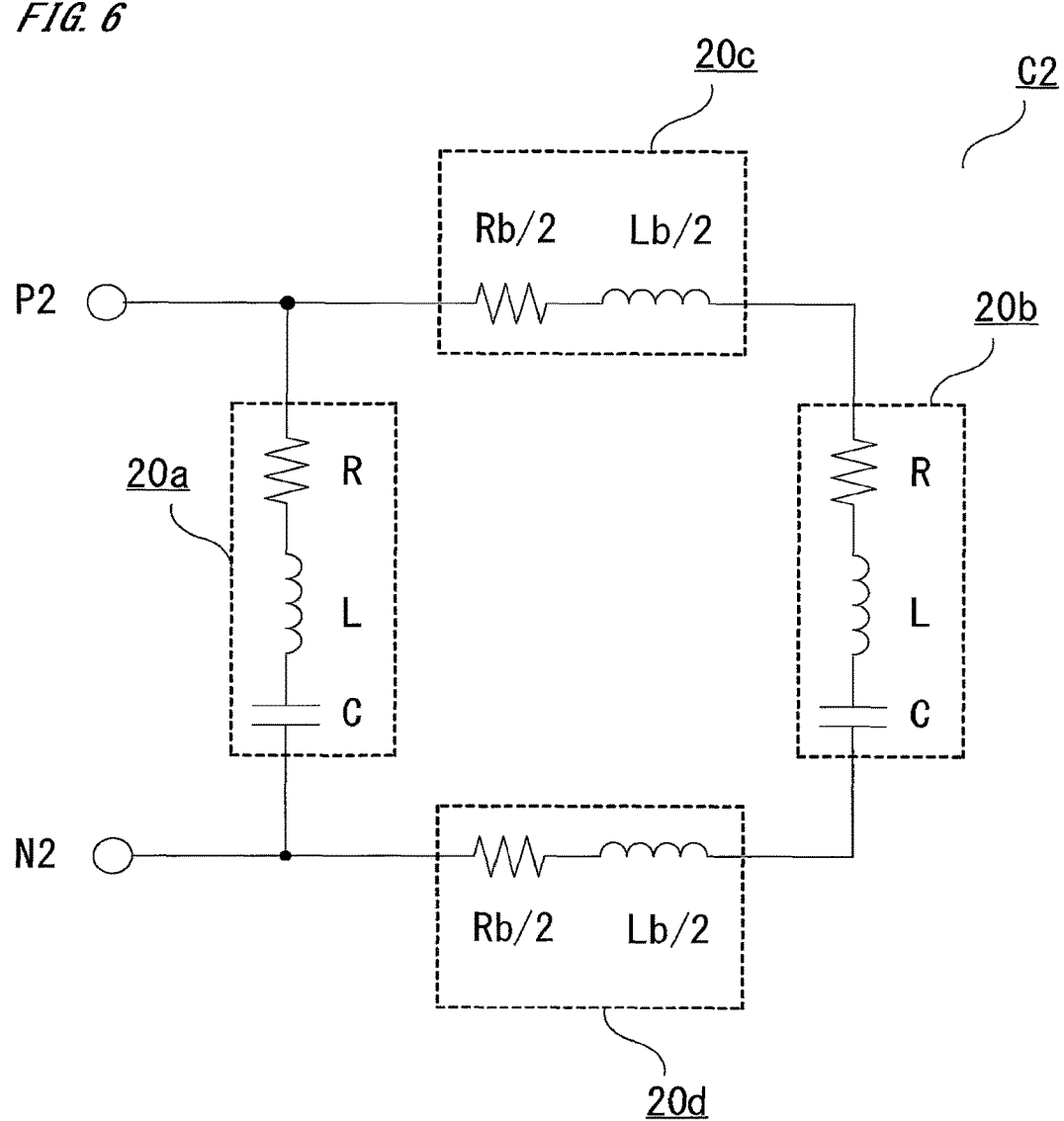
FIG. 6 is a detailed circuit diagram of the high-voltage side capacitor according to Embodiment 1 of the invention.

FIG. 6 is a circuit diagram in which parasitic components in the high-voltage side capacitor C2 are taken into consideration. Note that, for simplifying the circuit diagram, each ESR and each ESL (Equivalent Series Inductance) from each of the terminals P2 and N2 to the first capacitor element 20a are ignored.

As shown in FIG. 6, the first capacitor element 20a and the second capacitor element 20b are each represented by a capacitive component (C), an ESR (R) and an ESL (L). Further, the first bus bar 20c and the second bus bar 20d are each represented by an ESR (Rb/2) and an ESL (Lb/2). Note that, for simplification's sake, a component of parasitic capacitance in each of the bus bars is ignored here.

Here, assuming that the P2 and N2 terminals are basic points, an impedance Z1 of the first capacitor element 20a is represented by a formula (1). Note that w denotes an angular frequency.

$$Z1 = R + j(\omega L - (1/\omega C)) \quad (1)$$

Accordingly, a serial resonance frequency fs1 of the first capacitor element 20a is represented by a formula (2).

$$fs1 = 1/(2\pi\sqrt{(LC)}) \quad (2)$$

Meanwhile, assuming that the P2 and N2 terminals are basic points, an impedance Z2 of the second capacitor element 20b is represented by a formula (3).

$$Z2 = (R+Rb) + j(\omega L + \omega Lb - (1/\omega c)) \quad (3)$$

Accordingly, a serial resonance frequency fs2 of the second capacitor element 20b inclusive of the bus bars 20c, 20d is represented by a formula (4).

$$fs2 = 1/(2\pi\sqrt{(L+Lb)/C)}) \quad (4)$$

As described previously, switching of the switching elements S1, S2 is controlled at the frequency fsw, and accordingly, the high-voltage side capacitor C2 operates also at the frequency fsw.

In the first capacitor element 20a at a frequency equal to or more than the serial resonance frequency fs1, and in the second capacitor element 20b at a frequency equal to or more than the serial resonance frequency fs2, respectively, inductance components appear in their impedances. Accordingly, in order to cause the first and second capacitor elements 20a to function each as a capacitor, the frequency fsw for switching is set to a value that is less than the series resonance frequency fs1 of the first capacitor element 20a and also less than the series resonance frequency fs2 of the second capacitor element 20b.

Further, when the low-voltage side capacitor C1 is assumed to be configured with two capacitor elements of a third capacitor element and a fourth capacitor element that are connected in parallel to each other, in order to cause the third and fourth capacitor elements to function each as a capacitor, the frequency fsw for switching is set to a value that is less than a series resonance frequency fs3 of the third capacitor element and also less than a series resonance frequency fs4 of the fourth capacitor element.

In this manner, the frequency fsw for switching the switching elements S1, S2 is set to be less than the series resonance frequencies fs1 to fs4 of all of the capacitor elements in the low-voltage side capacitor C1 and the high-voltage side capacitor C2.

Figure 7:
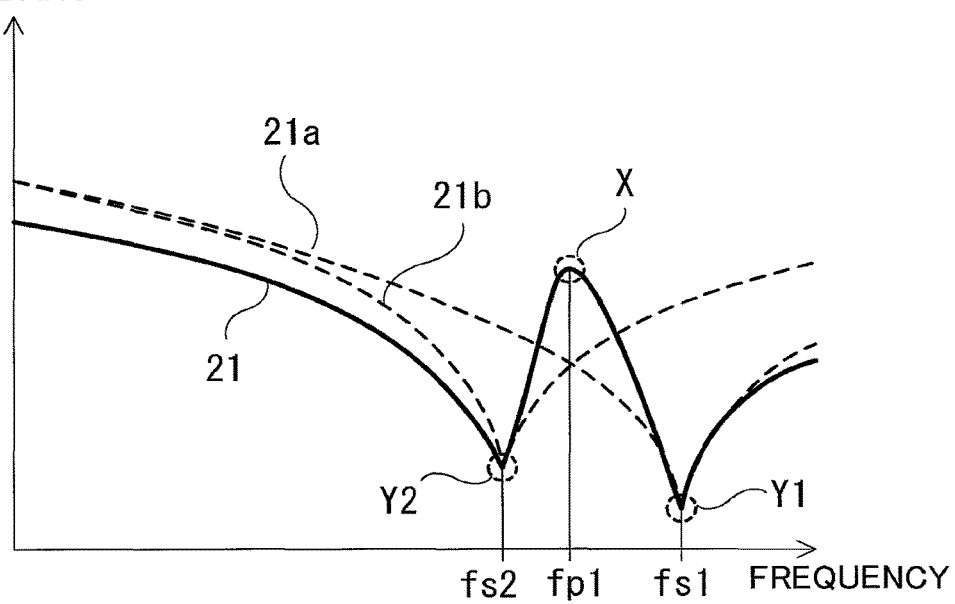
FIG. 7 is a diagram showing a frequency characteristic of impedance of the high-voltage side capacitor according to Embodiment 1 of the invention.

In FIG. 7, a frequency characteristic of impedance of the high-voltage side capacitor C2 is shown. Here, an impedance 21a of the first capacitor element 20a, an impedance 21b of the second capacitor element 20b and an impedance 21 of the high-voltage side capacitor C2 composed of the first and second capacitor elements 20a, 20b, are shown.

As shown in FIG. 7, the impedance 21a of the first capacitor element 20a has a series resonance point Y1 at the series resonance frequency fs1 determined from the formula (2). The impedance 21b of the second capacitor element 20b has a series resonance point Y2 at the series resonance frequency fs2 determined from the formula (4).

At a frequency between fs2 and fs1, the first capacitor element 20a functions as a capacitor while the second capacitor element 20b functions as an inductor, so that parallel resonance occurs between the first capacitor element 20a and the second capacitor element 20b, and as a result, the impedance of the high-voltage side capacitor C2 increases. As shown in FIG. 7, the impedance 21 of the high-voltage side capacitor C2 takes a maximum value at a parallel resonance point X with a parallel resonance frequency fp1 (fs2<fp1<fs1).

Figure 8:
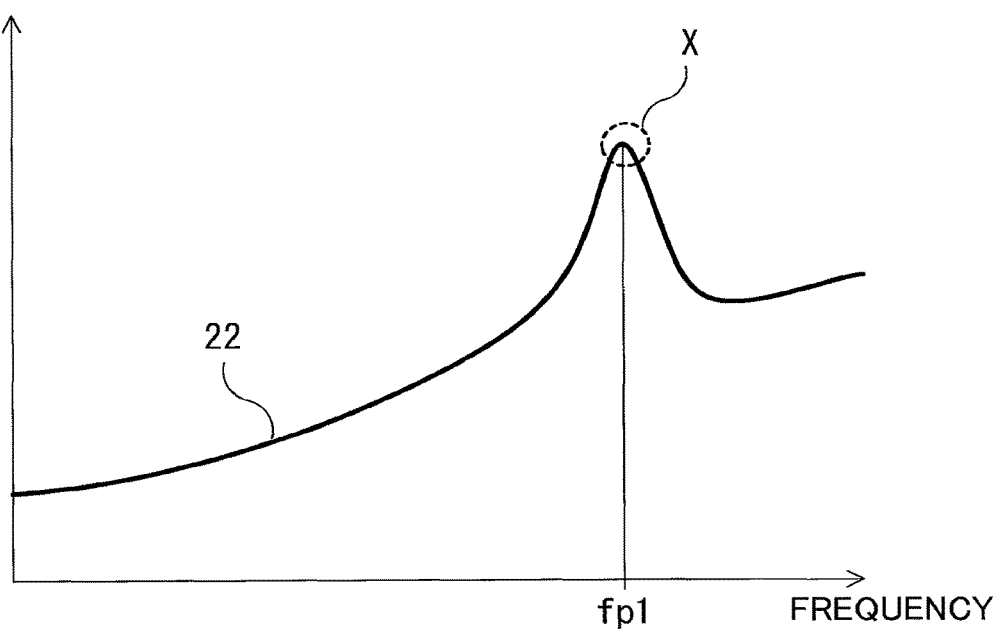
FIG. 8 is a diagram showing a frequency characteristic of ESR of the high-voltage side capacitor according to Embodiment 1 of the invention.

In FIG. 8, a frequency characteristic of ESR of the high-voltage side capacitor C2 is shown. As shown in FIG. 8, an ESR 22 of the high-voltage side capacitor C2 increases to take a maximum value at the parallel resonance point X with the parallel resonance frequency fp1, similarly to the impedance.

Figure 9:
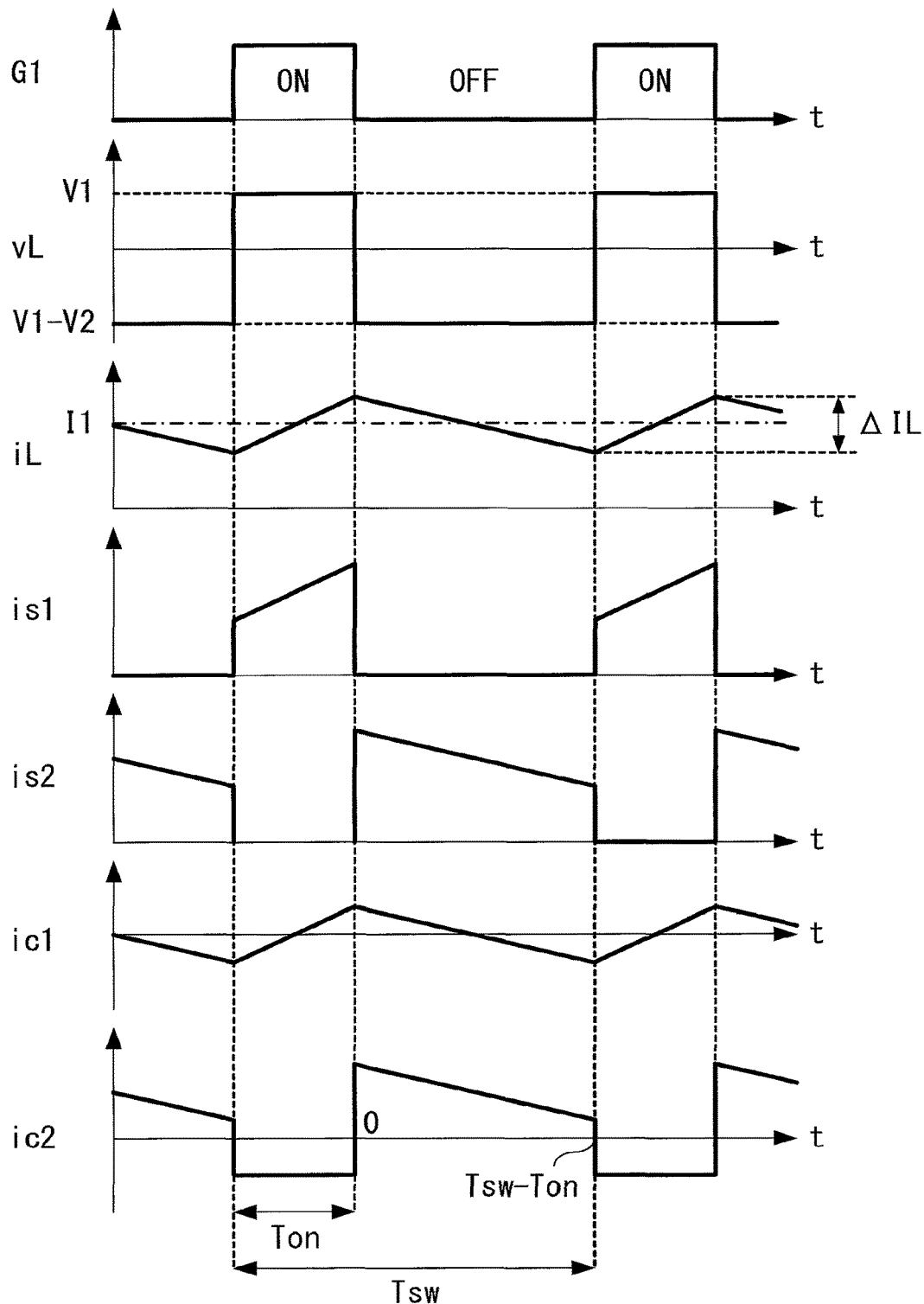
FIG. 9 is waveform charts at respective portions for illustrating operations of the power conversion device according to Embodiment 1 of the invention.

FIG. 9 is waveform charts at respective portions for illustrating operations of the power conversion device 5. In descending order from the top, there are shown the respective waveform charts of: the gate signal G1 for the switching element S1; a voltage vL across the reactor 1; a current iL flowing through the reactor 1; a current is1 flowing through the switching element S1; a current is2 flowing through the switching element S2; a current ic1 flowing through the low-voltage side capacitor C1; and a current ic2 flowing through the high-voltage side capacitor C2. It is noted that periodically variable current and voltage are indicated using small letters of i and v, respectively.

Here, when the direction of the current flowing from the terminal P1 toward the terminal P2 is defined to be positive, an effective value Is2(rms) of the current flowing through the switching element S2 is represented by a formula (5).

Besides, it is defined that: a low-voltage side voltage is V1; a high-voltage side voltage is V2; power on the low-voltage side is P1; an inductance value of the reactor 1 is L; a switching frequency (carrier frequency) of the switching elements S1, S2 is fsw; a switching period is Tsw; a turn-on time of the switching element S1 is Ton; a duty ratio of the switching element S1 is D; a DC current flowing through the reactor 1 is I1; and a ripple component in the current flowing through the reactor 1 is ΔIL.

[Mathematical 1]

$$Is2(\text{rms}) = \sqrt{\frac{1}{Tsw}\int_0^{Tsw-Ton}\left\{-\frac{\Delta IL}{Tsw-Ton}\cdot t + \left(I1 + \frac{\Delta IL}{2}\right)\right\}^2 dt} \quad (5)$$

$$= \sqrt{\frac{1-D}{3}\left\{\left(I1 + \frac{\Delta IL}{2}\right)^2 + \left(I1 - \frac{\Delta IL}{2}\right)^2 + \left(I1 + \frac{\Delta IL}{2}\right)\left(I1 - \frac{\Delta IL}{2}\right)\right\}}$$

Further, an average value Is2(ave) of the current flowing through the switching element S2 is represented by a formula (6).

[Mathematical 2]

$$Is2(ave) = \frac{1}{Tsw}\int_0^{Tsw-Ton}\left\{-\frac{\Delta IL}{Tsw-Ton}\cdot t + \left(I1 + \frac{\Delta IL}{2}\right)\right\}dt \quad (6)$$

$$= I1(1-D)$$

An effective value Ic2(rms) of the current flowing through the high-voltage side capacitor C2 is represented by a formula (7).

[Mathematical 3]

$$Ic2(\text{rms}) = \sqrt{Is2(\text{rms})^2 - Is2(ave)^2} \quad (7)$$

$$= \sqrt{(1-D)\cdot\left(I1^2 + \frac{\Delta IL^2}{12}\right) - (1-D)^2\cdot I1^2}$$

It is noted that D, I1 and ΔIL are represented by a formula (8) to a formula (10), respectively.

$$D=1-(V1/V2) \quad (8)$$

$$I1=P1/V1 \quad (9)$$

$$\Delta IL=D \cdot V1/(L \cdot fsw) \quad (10)$$

Figure 10:
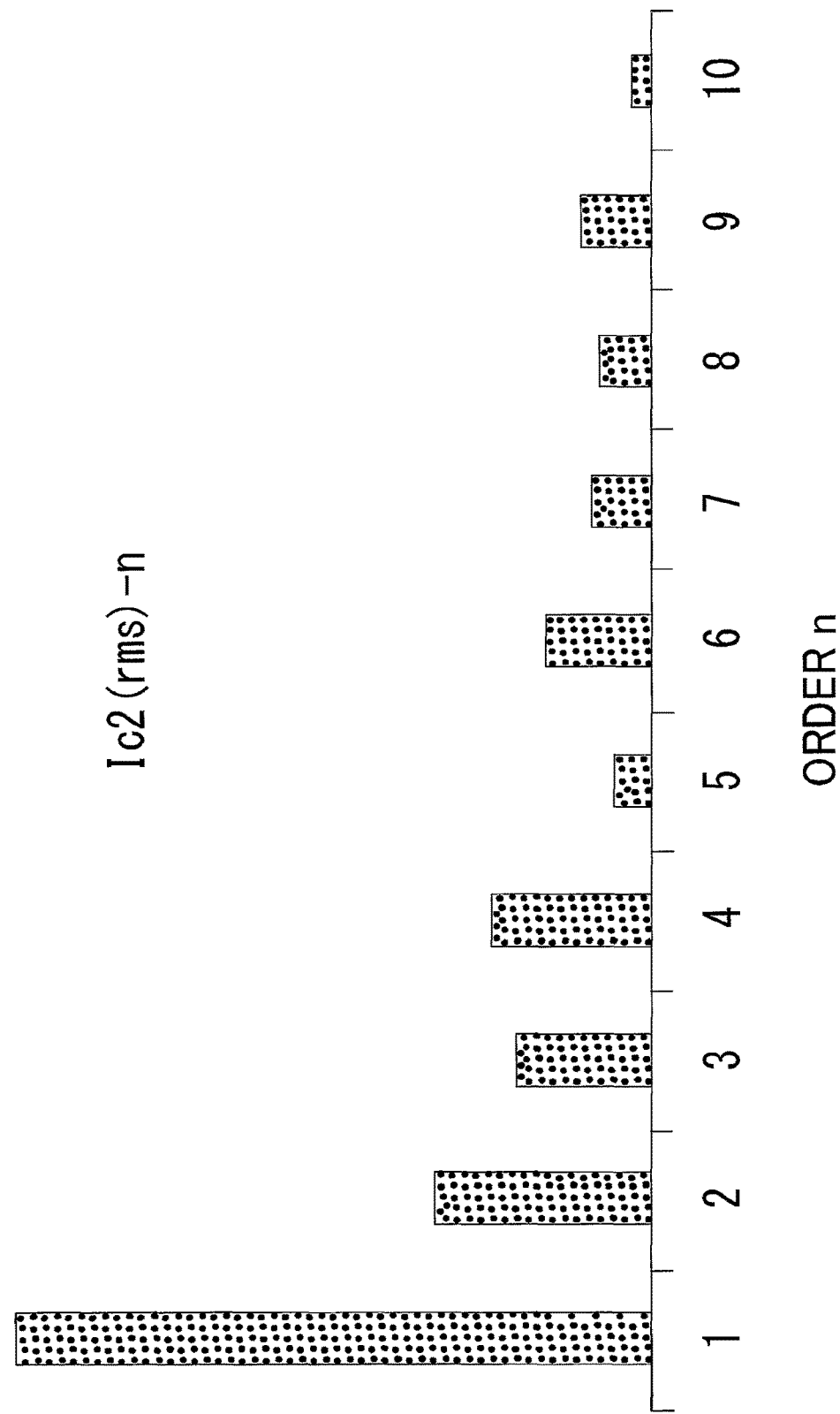
FIG. 10 is a characteristic diagram showing current components flowing through the high-voltage side capacitor according to Embodiment 1 of the invention.

FIG. 10 is a characteristic diagram showing a fundamental-wave component and harmonic components in the current flowing through the high-voltage side capacitor C2. The condition is V1=200V, V2=500V and I1=100 A, and Ic2 (rms)-n denotes an n-th order harmonic component in Ic2 (rms). Note that when n is 1, it denotes the fundamental-wave component with respect to the frequency fsw.

As shown in FIG. 10, it is found that odd order and even order harmonic components are included in the current Ic2 flowing through the high-voltage capacitor C2.

Figure 11:
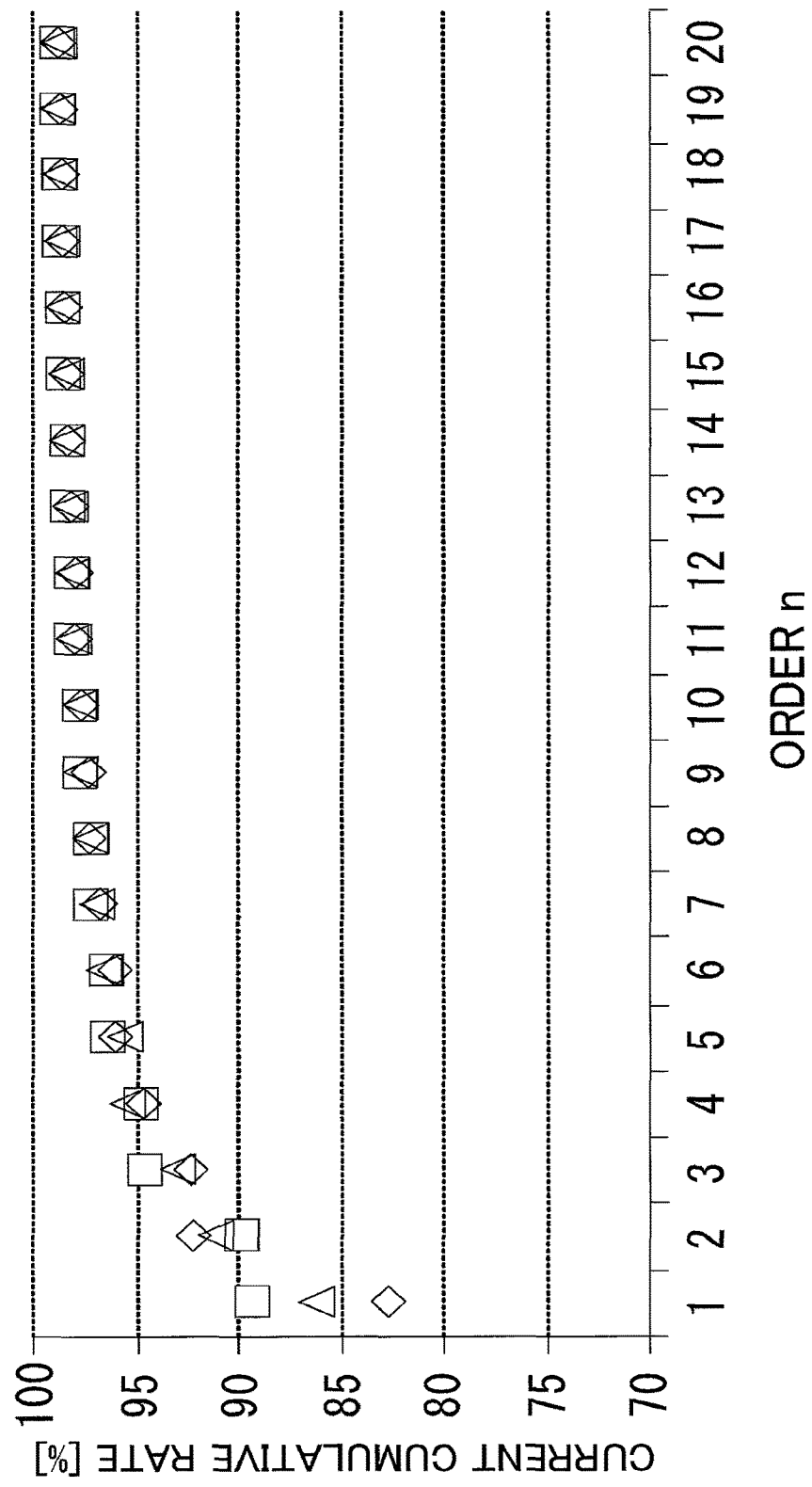
FIG. 11 is a characteristic diagram showing a current cumulative rate with respect to a current flowing through the high-voltage side capacitors according to Embodiment 1 of the invention.

FIG. 11 is a characteristic diagram showing a current cumulative rate of components up to each order harmonic component in the current flowing through the high-voltage side capacitor C2. The condition is V1=200V and I1=100 A.

Here, the current cumulative rate of components up to an n-th order harmonic component in Ic2(rms), namely, the current cumulative rate of the first order to n-th order harmonic components, is represented by a formula (11). Note that Ic2(rms)-k denotes a k-th order harmonic component in Ic2(rms).

[Mathematical 4]

$$\frac{\sum_{k=1}^{n}(Ic2(\text{rms})-k)}{Ic2(\text{rms})} \times 100 \quad (11)$$

As shown in FIG. 11, in any of cases of V2=300V, 400V and 500V, with respect to Ic2(rms), 95% or more of all current components are included in the harmonic components of from the first order (fundamental-wave component) to the fifth order. Namely, in the current flowing through the high-voltage side capacitor C2, the harmonic components of from the first order to the fifth order can be said to be dominant, thus resulting in a saturated state of the current cumulative rate.

Figure 12:
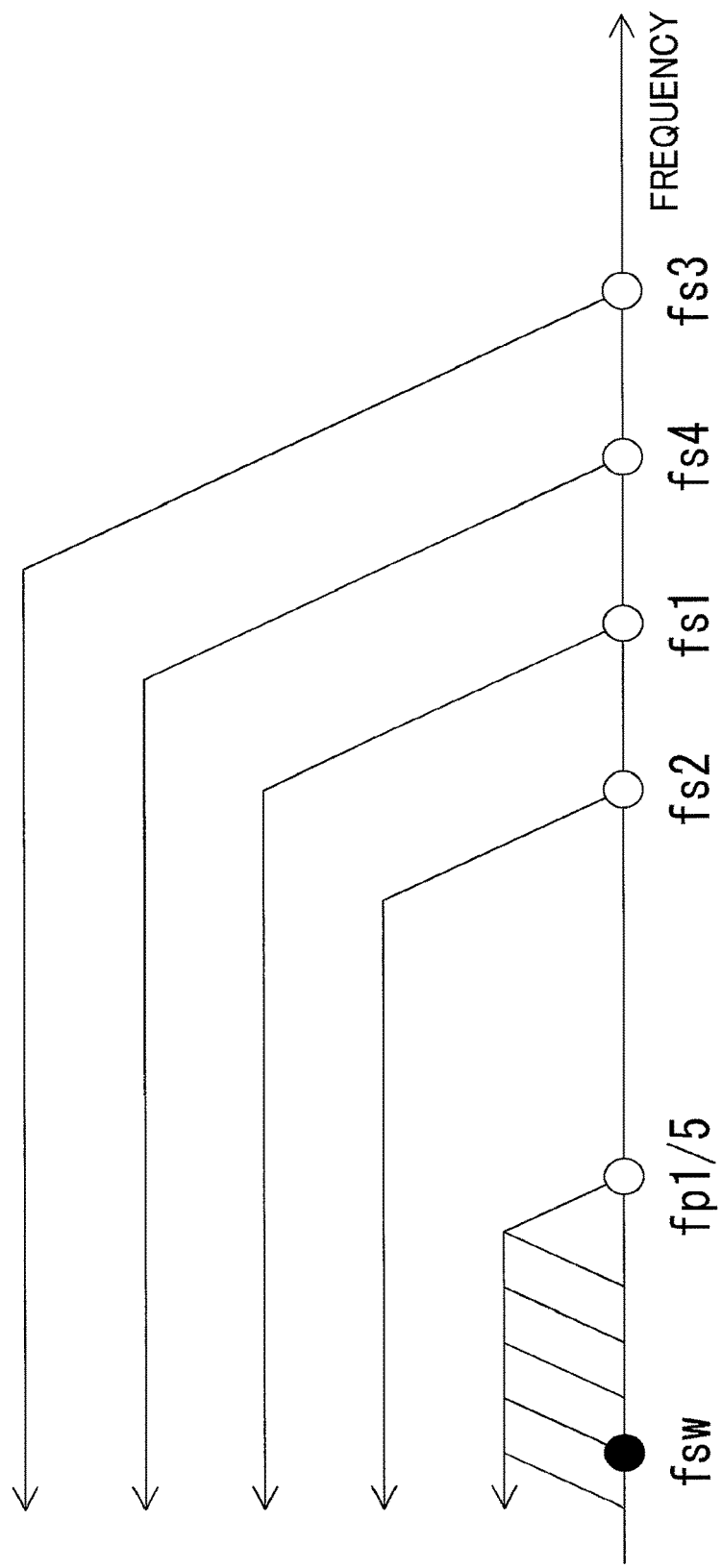
FIG. 12 is a brief diagram for illustrating a carrier frequency according to Embodiment 1 of the invention.

FIG. 12 is a brief diagram for illustrating how to set the carrier frequency fsw.

The low-voltage side capacitor C1 is configured similarly to the high-voltage side capacitor C2 shown in FIG. 2 and FIG. 3, and when its capacitance is only assumed to be smaller than that of the high-voltage side capacitor C2, the relationship among the series resonance frequencies fs1 to fs4 of the first to fourth capacitor elements are given as fs2<fs1<fs4<fs3. As described previously, the carrier frequency fsw is set to be less than the series resonance frequencies fs1 to fs4 of the first to fourth capacitor elements that are all capacitor elements in the low-voltage side capacitor C1 and the high-voltage side capacitor C2.

Further, the carrier frequency fsw is set so that: the first order to fifth order harmonic components in Ic2(rms) each have a frequency that is lower than the parallel resonance frequency fp1 of the high-voltage side capacitor C2 at which the ESR takes a maximum value; and furthermore, the frequencies of the harmonic components in Ic2(rms) do not overlap with the parallel resonance frequency fp1. Namely, the carrier frequency fsw is set so that it is lower than one-fifth of the parallel resonance frequency fp1 of the high-voltage side capacitor C2 and its integer multiples are each not equal to the parallel resonance frequency fp1. Note that the thus-set carrier frequency fsw is stored in the storage 45b.

When a k-th order harmonic component of the ESR in the high-voltage side capacitor C2 is defined as Rc2-k, a total loss Pc2-n due to the harmonic components of from the first order to n-th order, in the high-voltage side capacitor C2, is represented by a formula (12).

[Mathematical 5]

$$Pc2-n=\sum_{k=1}^{n}((Rc2-k) \times (Ic2(\text{rms})-k)^2) \quad (12)$$

Since the carrier frequency fsw is set so that its integer multiples are each not equal to the parallel resonance frequency fp1 of the high-voltage side capacitor C2, the frequencies of the harmonic components in the current Ic2(rms) flowing through the high-voltage side capacitor C2 do not overlap with the parallel resonance frequency fp1. Thus, it is possible to prevent the respective harmonic components of the ESR in the high-voltage side capacitor C2 from reaching their maximum values.

Moreover, since the carrier frequency fsw is set to a value that is less than (fp1/5), the respective (Rc2-1) to (Rc2-5) that are ESRs corresponding to the first order to fifth order harmonic components that are dominant in the current Ic2(rms) flowing through the high-voltage side capacitor C2, can be surely prevented from reaching their maximum values, and furthermore, can be set to relatively small values within less than the maximum values.

For these reasons, it is possible to suppress the loss in the high-voltage side capacitor C2 represented by the formula (12).

As described above, in the power conversion device 5 according to Embodiment 1, the carrier frequency (switching frequency) fsw for driving the switching elements S1, S2 is set so that: it is less than the series resonance frequencies fs1 to fs4 of the first to fourth capacitor elements that are all capacitor elements in the low-voltage side capacitor C1 and the high-voltage side capacitor C2; and furthermore, it is less than one-fifth of the parallel resonance frequency fp1 of the high-voltage side capacitor C2, and integer multiples (odd multiples and even multiples) of the carrier frequency fsw are each not equal to the parallel resonance frequency fp1.

Thus, it is possible to suppress the loss caused by the ESR that increases due to parallel resonance of the high-voltage side capacitor C2 and by the harmonic currents, to thereby reduce the loss in the high-voltage side capacitor C2 produced due to control of the switching elements S1, S2.

Further, since the current flowing through the high-voltage side capacitor C2 is larger than that flowing through the low-voltage side capacitor C1, the loss reduction effect is significant.

Further, when the carrier frequency fsw is set in the above manner, the loss that increases due to parallel resonance of the high-voltage side capacitor C2 can be suppressed, so that it is possible to improve the power conversion efficiency of the power conversion device 5, and to suppress temperature rise of the high-voltage side capacitor C2 to thereby improve the reliability as well. In addition, such a loss reduction and temperature-rise suppression effect for the high-voltage side capacitor C2 can be achieved without requiring increase of the capacity of the high-voltage side capacitor C2 and expansion of its cooling structure. This makes it possible to accomplish downsizing of the device configuration and cost reduction.

It is noted that, in the above embodiment, the carrier frequency fsw is set to be less than one-fifth of the parallel resonance frequency fp1 of the high-voltage side capacitor C2; however, it may be set to be lower than a value (fp1/N) resulting from dividing the parallel resonance frequency fp1 by an order N that is determined so that the current cumulative rate with respect to the current flowing through the high-voltage side capacitor C2 reaches its saturated state with the fundamental-wave component and the harmonic components up to the order N.

Further, the order for dividing the parallel resonance frequency fp1 may instead be an order that is lower than the order with which the saturated state is given. Even in that case, since the carrier frequency fsw is set so that it is less than the series resonance frequencies fs1 to fs4 of the first to fourth capacitor elements, and its integer multiples are each not equal to the parallel resonance frequency fp1, there is provided an effect of reducing the loss due to parallel resonance, in the high-voltage side capacitor C2.

Furthermore, the high-voltage side capacitor C2 and the low-voltage side capacitor C1 are each configured with two capacitor elements connected in parallel to each other; however, it may be configured with three or more capacitor elements connected in parallel to each other, and the number of parallel capacitor elements may differ between these capacitors.

When three or more capacitor elements are connected in parallel to each other in the high-voltage side capacitor C2, two or more parallel resonance frequencies may arise in some cases, so that the carrier frequency used for controlling the switching elements S1, S2 is set to a value that is less than one-fifth of the lowest parallel resonance frequency.

Further, in Embodiment 1, the power conversion device 5 is provided as an SPC circuit of a bidirectional type capable of converting power bidirectionally; however, it may be configured to convert power unidirectionally from the low-voltage side to the high-voltage side in such a manner, for example, that a diode is used as the second semiconductor element in place of the second switching element S2, and this provides a similar effect when the carrier frequency fsw is set similarly.

Embodiment 2

Next, a power conversion device according to Embodiment 2 of the invention will be described based on drawings as follows.

Figure 13:
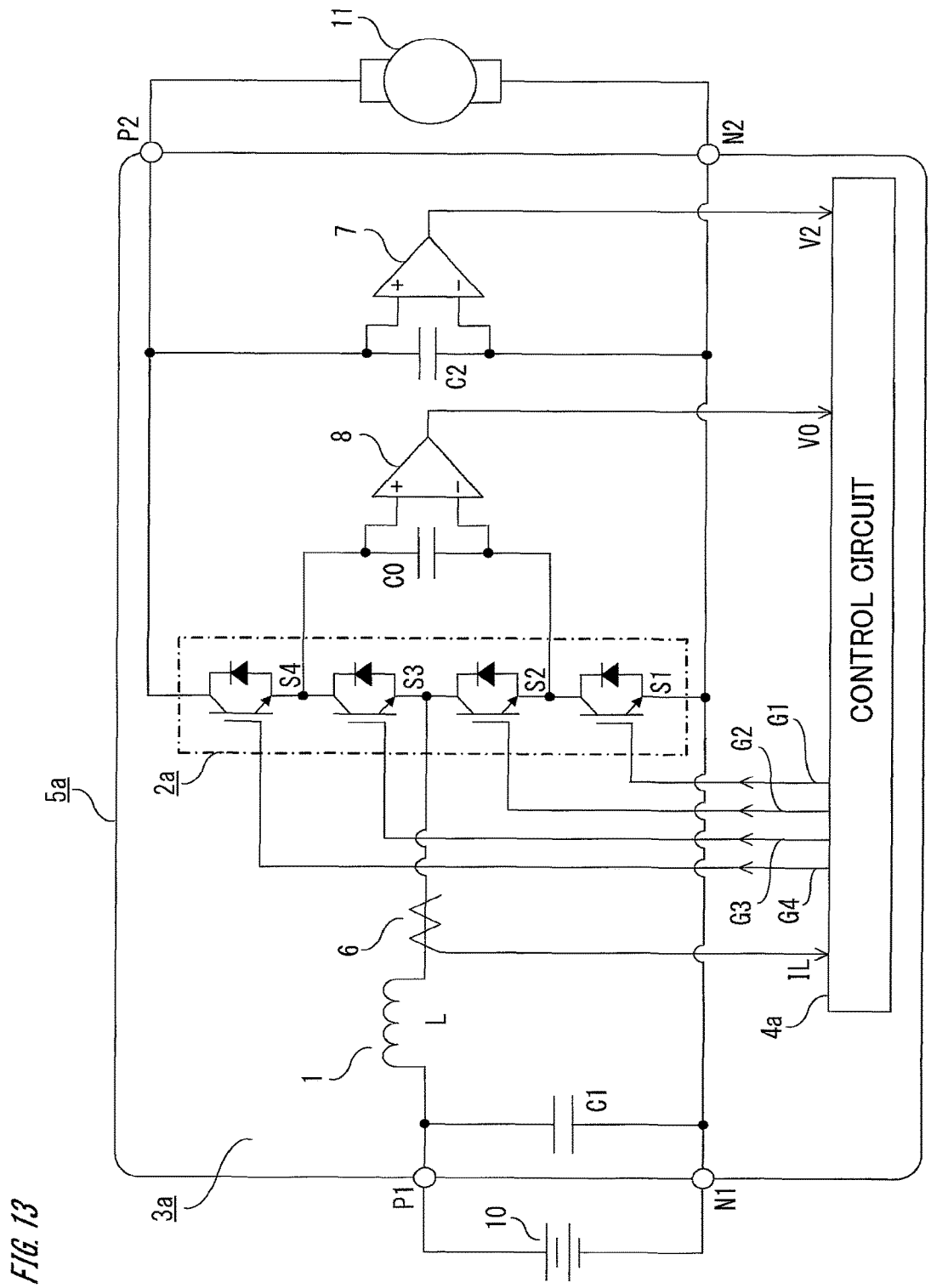
FIG. 13 is a diagram showing a circuit configuration of a power conversion device according to Embodiment 2 of the invention.

FIG. 13 is a diagram showing a circuit configuration of the power conversion device according to Embodiment 2 of the invention. As shown in FIG. 13, a power conversion device 5a includes a DC/DC converter 3a as a main circuit, and a control circuit 4a for controlling the DC/DC converter 3a. The DC/DC converter 3a includes: a reactor 1; a semiconductor module 2a; a low-voltage side capacitor C1; a high-voltage side capacitor C2; and a charging/discharging capacitor C0 as a first capacitor. The semiconductor module 2a is configured with a switching element S1 as a first semiconductor element, a switching element S2 as a second semiconductor element, a switching element S3 as a third semiconductor element and a switching element S4 as a fourth semiconductor element, that are connected in series to each other. Further, a current sensor 6 and voltage sensors 7, 8 are provided in the DC/DC converter 3a. The control circuit 4a controls driving of the switching elements S1 to S4, based on the detection values from the respective sensors 6 to 8.

Further, a high-voltage battery 10 and an electric motor 11 are connected to the low-voltage side (between P1 and N1) and the high-voltage side (between P2 and N2) of the DC/DC converter 3a, respectively. Note that the switching elements S1 to S4 are each composed of, for example, an IGBT and a diode connected in reverse parallel thereto.

The power conversion device 5 is an MLC circuit of a bidirectional type capable of converting power bidirectionally between the low-voltage side and the high-voltage side, and serves to step up an input voltage (low-voltage side voltage) V1 inputted between P1 and N1 as low-voltage side terminals, to a voltage higher than V1 and then to output between P2 and N2 as high-voltage side terminals, an output voltage (high-voltage side voltage) V2 after stepped up. The switching element S1 is connected at its one end (first end) to the negative-side terminal of the low-voltage side capacitor C1. The switching element S2 is connected at its one end (first end) to a second end of the switching element S1, and connected at the other end (second end) to the positive-side terminal of the low-voltage side capacitor C1 through the reactor 1. The switching element S3 is connected at its one end (first end) to the second end of the switching element S2. The switching element S4 is connected at its one end (first end) to a second end of the switching element S3, and connected at the other end (second end) to the positive-side terminal of the high-voltage side capacitor C2.

Furthermore, the charging/discharging capacitor C0 is connected at its one end to an intermediate connection point between the switching element S1 and the switching element S2, and connected at the other end to an intermediate connection point between the switching element S3 and the switching element S4.

The low-voltage side capacitor C1 smooths the input voltage V1. The reactor 1 is used for energy storage, and the semiconductor module 2a and the charging/discharging capacitor C0 step up the input voltage V1 to the output voltage V2. On this occasion, the switching elements S1 to S4 in the semiconductor module 2a are turned ON when gate signals G1 to G4 outputted by the control circuit 4a are High, respectively.

The current sensor 6 detects a reactor current IL flowing through the reactor 1. The voltage sensor 7 detects a voltage between the terminals of the high-voltage side capacitor C2, as the output voltage V2 (high-voltage side voltage). The voltage sensor 8 detects a voltage between the terminals of the charging/discharging capacitor C0, as an intermediate voltage V0. The high-voltage side capacitor C2 smooths the output voltage V2.

The control circuit 4a generates the gate signals G1 to G4 for the respective switching elements S1 to S4, according to a detection value (IL) of the current sensor 6 and detection values (V2, V0) of the voltage sensors 7, 8, to thereby cause each of the switching elements S1 to S4 to perform ON/OFF operation.

Figure 14:
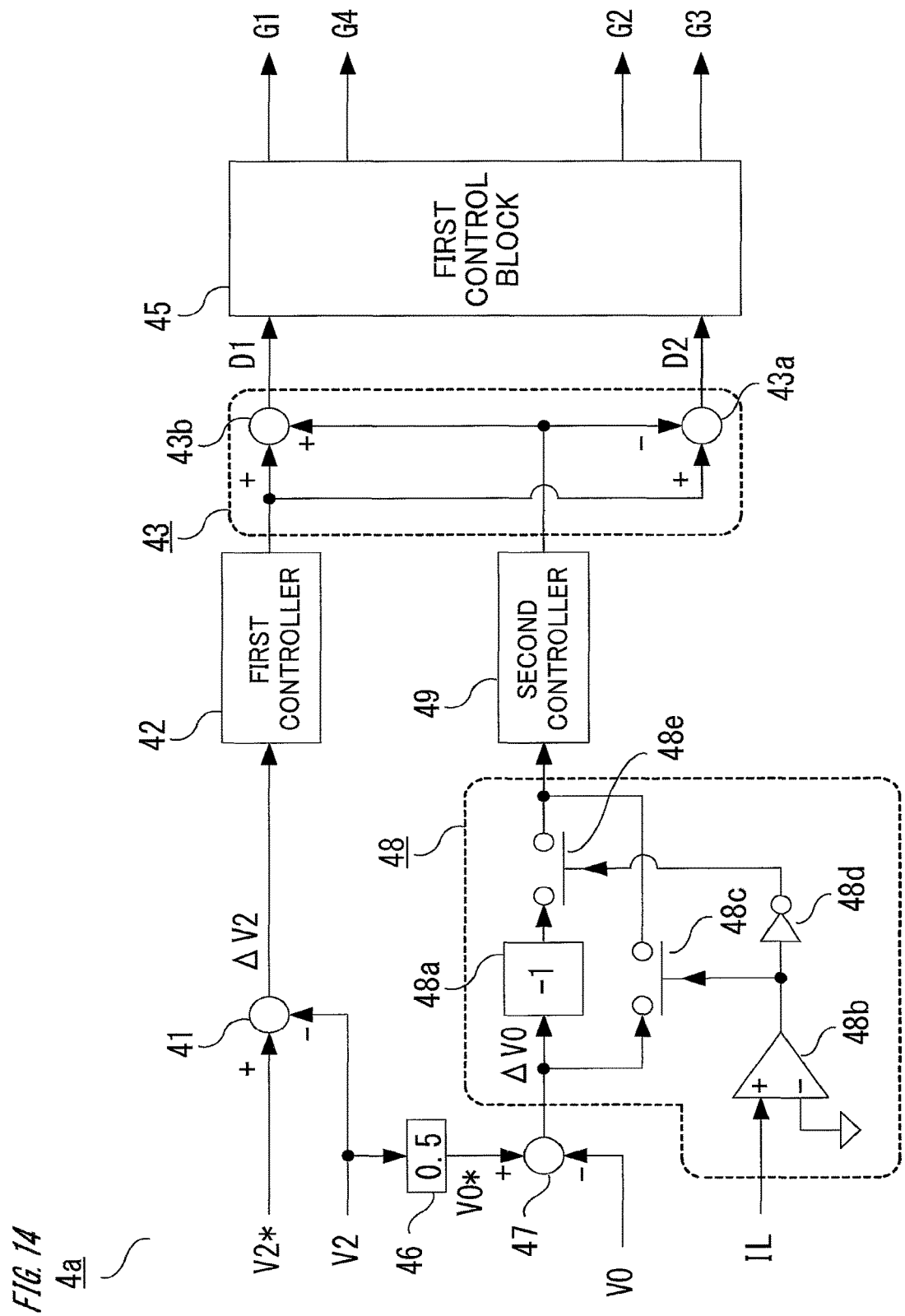
FIG. 14 is a control block diagram of the power conversion device according to Embodiment 2 of the invention.

FIG. 14 is a control block diagram of the control circuit 4a. As shown in FIG. 14, the control circuit 4a has a subtractor 41, a first controller 42, a multiplier 46, a subtractor 47, a second control block 48, a second controller 49, a third control block 43 and a first control block 45. The second control block 48 has a multiplier 48a, a comparator 48b, a switching contact 48c, an inverter 48d and a switching contact 48e. The third control block 43 has a subtractor 43a and an adder 43b.

Figure 15:
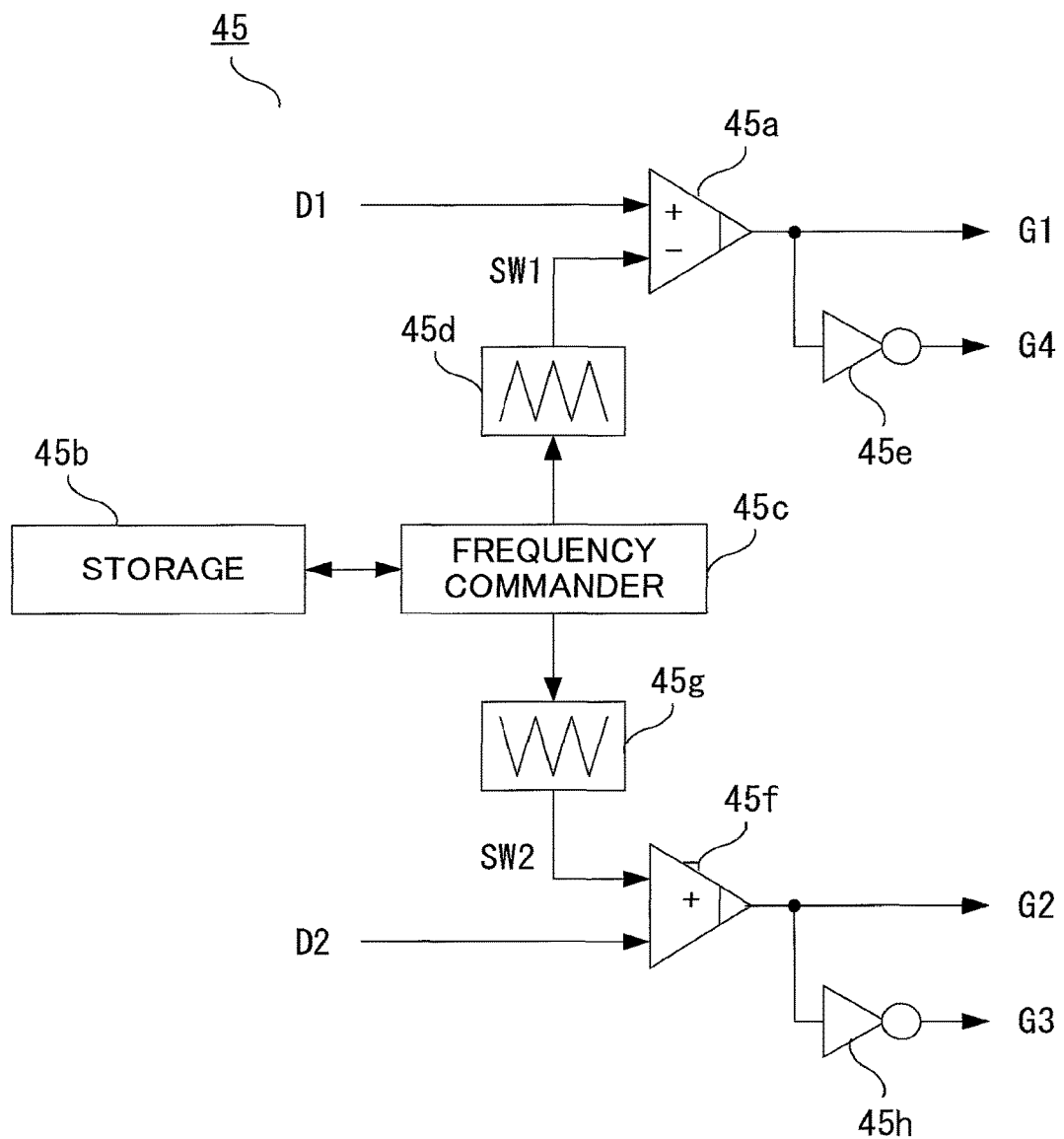
FIG. 15 is a block diagram showing details of a first control block according to Embodiment 2 of the invention.

Further, details of the first control block 45 are shown in FIG. 15. As shown in FIG. 15, the first control block 45 has a comparator 45a, storage 45b, a frequency commander 45c, a carrier signal generator 45d, an inverter 45e, a comparator 45f, a carrier signal generator 45g and an inverter 45h. Note that, in the storage 45b, a carrier frequency fsw as a preset frequency is stored.

Operations of the control circuit 4a, namely, how to control the DC/DC converter 3a, will be described based on FIG. 14 and FIG. 15, as follows. Note that, in this embodiment, in order to minimize the ripple current of the reactor 1, an intermediate-voltage target value V0* as a command value of the intermediate voltage is set to a value that is one-half (0.5 times) of the output voltage V2.

An output-voltage target value V2* as a command value of the high-voltage side voltage, and the detected output voltage V2, are inputted to the subtractor 41, and a differential voltage ΔV2 outputted by the subtractor 41 is inputted to the first controller 42. The first controller 42 executes PI control in which a proportional operation and an integral operation are combined, to thereby output a first calculation value. Further, in the multiplier 46 in which a multiplication constant is set to 0.5, the output voltage V2 is multiplied by 0.5, so that the intermediate-voltage target value V0* is generated. To the subtractor 47, the intermediate-voltage target value V0* and the intermediate voltage V0 as a voltage detection value of the charging/discharging capacitor C0 are inputted, so that a differential voltage ΔV0 therebetween is calculated and inputted to the second control block 48.

In the second block 48, the detected reactor current IL is inputted to the comparator 48b, so that the switching contacts 48c, 48e are made open or closed according to the polarity of the reactor current IL, to thereby change the polarity of the differential voltage ΔV0 between the intermediate-voltage target value V0* and the intermediate voltage V0. When the reactor current IL is positive, the differential voltage ΔV0 is outputted without change, and when the reactor current IL is negative, said voltage is multiplied by −1 in the multiplier 48a to be reversed in polarity and is then outputted because the switching contact 48e is made closed through the inverter 48d.

The second controller 49 executes P control for amplifying the output (±ΔV0) from the second control block 48, to thereby output a second calculation value.

To the third control block 43, the first calculation value from the first controller 42 and the second calculation value from the second controller 49 are inputted, so that these values are added together in the adder 43b and a difference therebetween is calculated in the subtractor 43a. The adder 43b outputs a duty ratio D1 as a conduction rate of the switching element S1, and the subtractor 43a outputs a duty ratio D2 as a conduction rate of the switching element S2.

The first control block 45 is a block for generating PWM signals (gate signals G1 to G4) using as its inputs, the duty ratios D1, D2 from the third control block 43. The frequency commander 45c refers to the carrier frequency fsw stored in the storage 45b, to thereby instruct the carrier signal generators 45d, 45g to generate a carrier signal with the frequency fsw. The carrier signal generator 45d generates a first triangular wave SW1 as the carrier signal with the frequency fsw, and the carrier signal generator 45g generates a second triangular wave SW2 as the carrier signal with the frequency fsw. Note that, in order to minimize the ripple current of the reactor 1, the first triangular wave SW1 and the second triangular wave SW2 are given as signals whose phases are mutually reversed by 180 degrees.

To the comparator 45a, the duty ratio D1 and the first triangular wave SW1 are inputted and are then mutually compared, so that the gate signal G1 for the switching element S1 is generated. Further, the inverter 45e inverts the gate signal G1 to thereby output the gate signal G4 for the switching element S4.

To the comparator 45f, the duty ratio D2 and the second triangular wave SW2 are inputted and are then mutually compared, so that the gate signal G2 for the switching element S2 is generated. Further, the inverter 45h inverts the gate signal G2 to thereby output the gate signal G3 for the switching element S3.

Similarly to Embodiment 1, the low-voltage side capacitor C1 and the high-voltage side capacitor C2 are each configured with two capacitor elements connected in parallel to each other, and likewise, the charging/discharging capacitor C0 is also configured with two capacitor elements connected in parallel to each other. Namely, as shown in FIG. 2 and FIG. 3, in each of the capacitors C0, C1 and C2, two capacitor elements are connected in parallel to each other by means of bus bars.

Similarly to Embodiment 1, the high-voltage side capacitor C2 is configured with a first capacitor element and a second capacitor element connected in parallel to each other, the low-voltage side capacitor C1 is configured with a third capacitor element and a fourth capacitor element connected in parallel to each other, and the charging/discharging capacitor C0 is configured with a fifth capacitor element and a sixth capacitor element connected in parallel to each other.

It is assumed that the respective capacitors C0, C1, C2 differ only in their capacitances, and when the capacitances of the respective capacitors C0, C1, C2 are represented by C0, C1, C2, they are given as C1<C0<C2. The relationship among the series resonance frequencies fs1 to fs6 of the first to sixth capacitor elements is provided as fs2<fs1<fs6<fs5<fs4<fs3.

As described previously, switching of the switching elements S1 to S4 is controlled at the frequency fsw, and accordingly, the capacitors C0, C2 operate at the frequency fsw and the capacitor C1 operates at a frequency of 2×fsw. In each of the first to sixth capacitor elements, at a frequency equal to or more than its serial resonance frequency, each inductance component appears in its impedance. Accordingly, in order to cause the respective first to sixth capacitor elements to function each as a capacitor, the frequency fsw for switching is set to be less than the series resonance frequencies fs1 to fs6 of all capacitor elements (first to sixth capacitor elements).

Further, among the currents flowing through the low-voltage side capacitor C1, the high-voltage side capacitor C2 and the charging/discharging capacitor C0, the current flowing through the charging/discharging capacitor C0 is largest.

Like the case shown in FIG. 7 of Embodiment 1, in the charging/discharging capacitor C0, at a frequency between the series resonance frequency fs6 of the sixth capacitor element and the series resonance frequency fs5 of the fifth capacitor element, the fifth capacitor element functions as a capacitor while the sixth capacitor element functions as an inductor, so that parallel resonance occurs between the fifth and sixth capacitor elements. Thus, the impedance of the charging/discharging capacitor C0 increases to take a maximum value. Here, the parallel resonance frequency of the charging/discharging capacitor C0 is defined as fp2.

Further, like the case shown in FIG. 8, the ESR of the charging/discharging capacitor C0 increases to take a maximum value at the parallel resonance point with the parallel resonance frequency fp2, similarly to the impedance.

Figure 16:
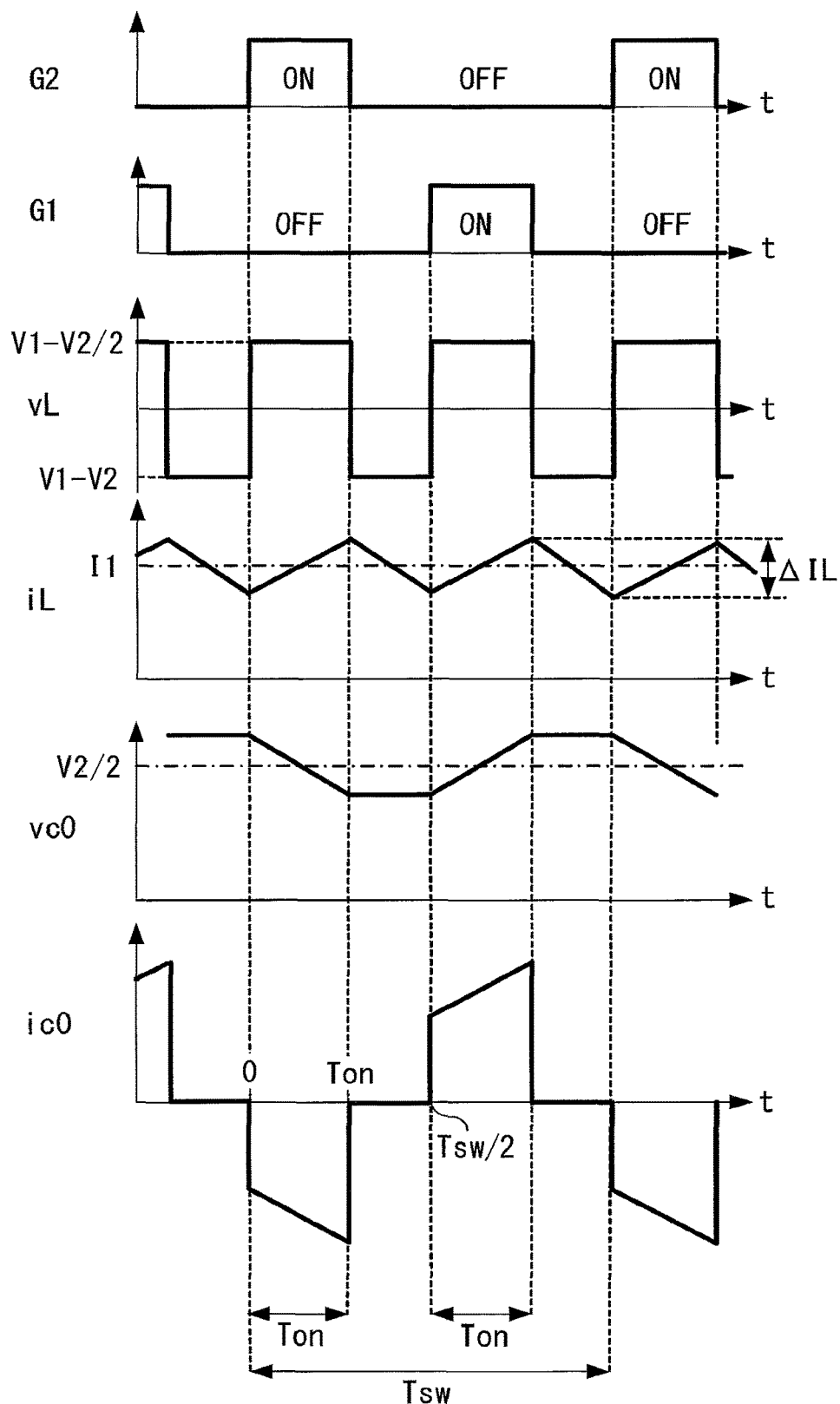
FIG. 16 is waveforms charts at respective portions for illustrating operations of the power conversion device according to Embodiment 2 of the invention.
Figure 17:
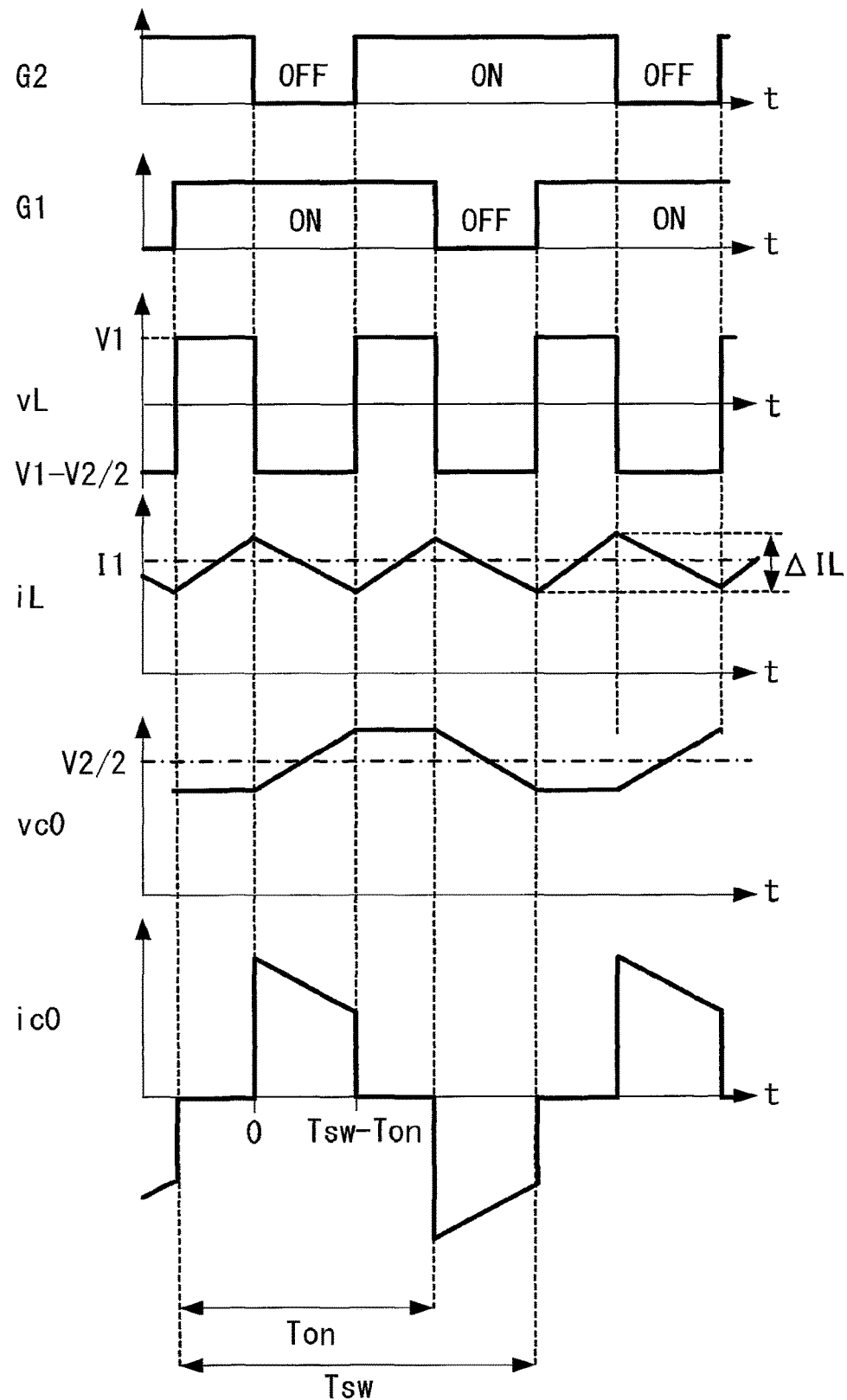
FIG. 17 is waveform charts at respective portions for illustrating operations of the power conversion device according to Embodiment 2 of the invention.

FIG. 16 and FIG. 17 are waveform charts at respective portions for illustrating operations of the power conversion device 5a. FIG. 16 shows those in the case where the duty ratios D1, D2 of the switching elements S1, S2 is each less than 0.5, and FIG. 17 shows those in the case where the duty ratios D1, D2 of the switching elements S1, S2 is each equal to or more than 0.5. In descending order from the top, there are shown the respective waveform charts of: the gate signal G2 for the switching element S2; the gate signal G1 for the switching element S1; a voltage vL across the reactor 1; a current iL flowing through the reactor 1; a voltage vc0 across the charging/discharging capacitor C0; and a current ic0 flowing through the charging/discharging capacitor C0. It is noted that periodically variable current and voltage are indicated using small letters of i and v, respectively.

Further, in a steady state, when the duty ratio D1 of the switching element S1 and the duty ratio D2 of the switching element S2 are made equal to each other, the output voltage V2 and the charging/discharging capacitor C0 will each converge, ideally, to a fixed value. Here, it is assumed that D1=D2=D.

Here, an effective value Ico(rms) of the current flowing through the charging/discharging capacitor C0 and a ripple component ΔIL in the current flowing through the reactor 1 are respectively represented by a formula (13) and a formula (14) when D<0.5, and by a formula (15) and a formula (16) when D≥0.5.

Besides, it is defined that: a low-voltage side voltage is V1; a high-voltage side voltage is V2; power on the low-voltage side is P1; an inductance value of the reactor 1 is L; a switching frequency (=carrier frequency) of the switching elements S1 to S4 is fsw; a switching period is Tsw; a turn-on time of the switching element S1 is Ton; duty ratios of the switching elements S1. S2 are each D; and a DC current flowing through the reactor 1 is

[Mathematical 6]

$$Ic0(\text{rms}) = \sqrt{\frac{2}{Tsw}\left[\int_0^{Ton}\left\{\frac{\Delta IL}{Ton}\cdot t + \left(I1 - \frac{\Delta IL}{2}\right)\right\}^2 dt\right]} \quad (13)$$

$$= \sqrt{2D\cdot\left(I1^2 + \frac{\Delta IL^2}{2}\right)}$$

$$\Delta IL = \frac{D}{L\cdot fsw}\cdot\left(V1 - \frac{V2}{2}\right) \quad (14)$$

[Mathematical 7]

$$Ic0(\text{rms}) = \sqrt{\frac{2}{Tsw}\left[\int_0^{Tsw-Ton}\left\{-\frac{\Delta IL}{Tsw-Ton}\cdot t + \left(I1 - \frac{\Delta IL}{2}\right)\right\}^2 dt\right]} \quad (15)$$

$$= \sqrt{2(1-D)\cdot\left(I1^2 + \frac{\Delta IL^2}{12}\right)}$$

$$\Delta IL = \frac{V1}{L\cdot fsw}\cdot\left(D - \frac{1}{2}\right) \quad (16)$$

It is noted that D and I1 are represented by a formula (17) and a formula (18), respectively.

$$D=1-(V1/V2) \quad (17)$$

$$I1=P1/V1 \quad (18)$$

Figure 18:
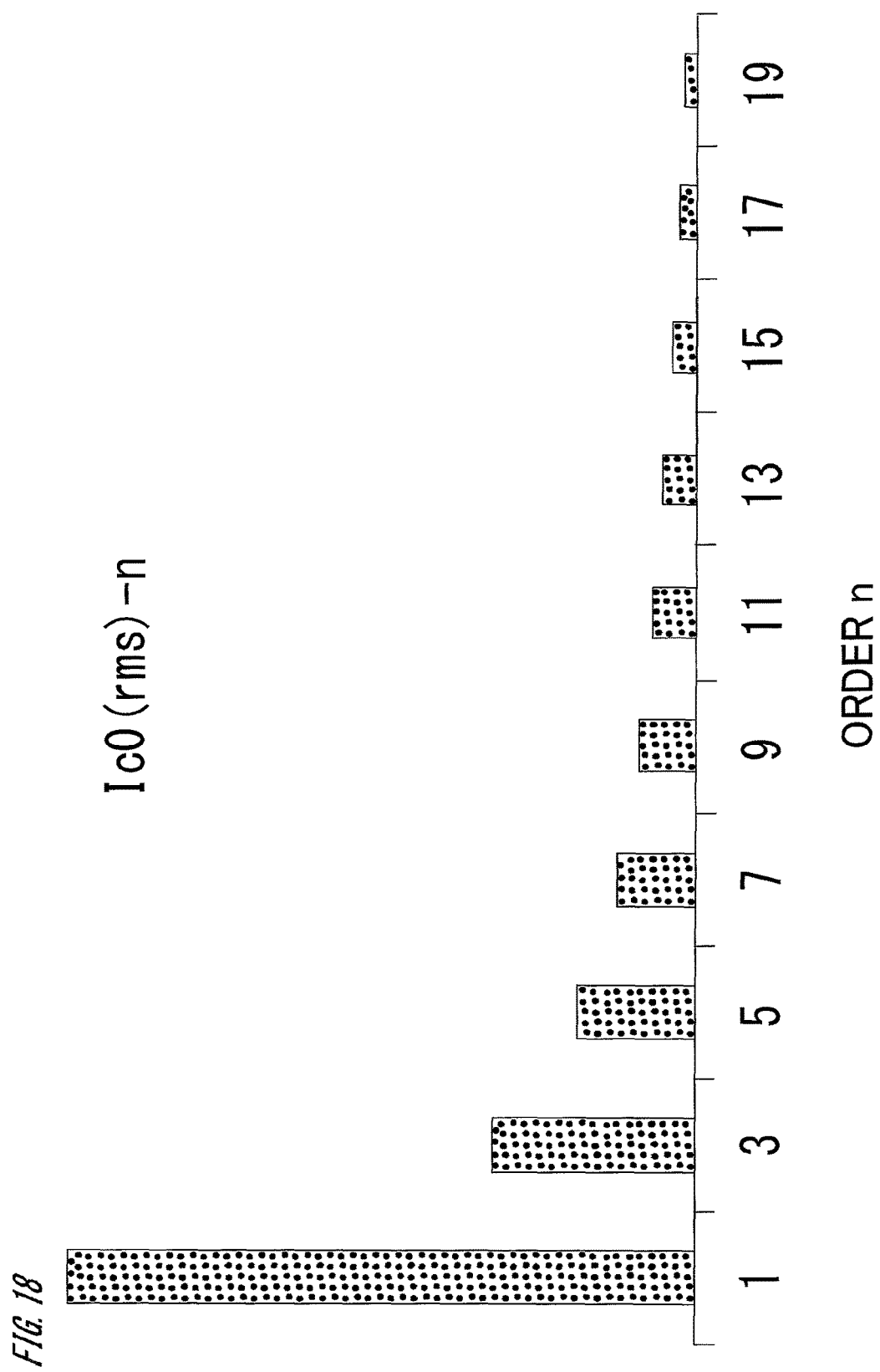
FIG. 18 is a characteristic diagram showing current components flowing through a charging/discharging capacitor according to Embodiment 2 of the invention.

FIG. 18 is a characteristic diagram showing a fundamental-wave component and harmonic components in the current flowing through the charging/discharging capacitor C0. The condition is V1=200V, V2=400V and I1=100 A, and Ic0(rms)-n denotes an n-th order harmonic component in ic0(rms). Note that when n is 1, it denotes the fundamental-wave component with respect to the frequency fsw.

As shown in FIG. 18, it is found that odd-order harmonic components are included in the current Ic0 flowing through the charging/discharging capacitor C0.

Figure 19:
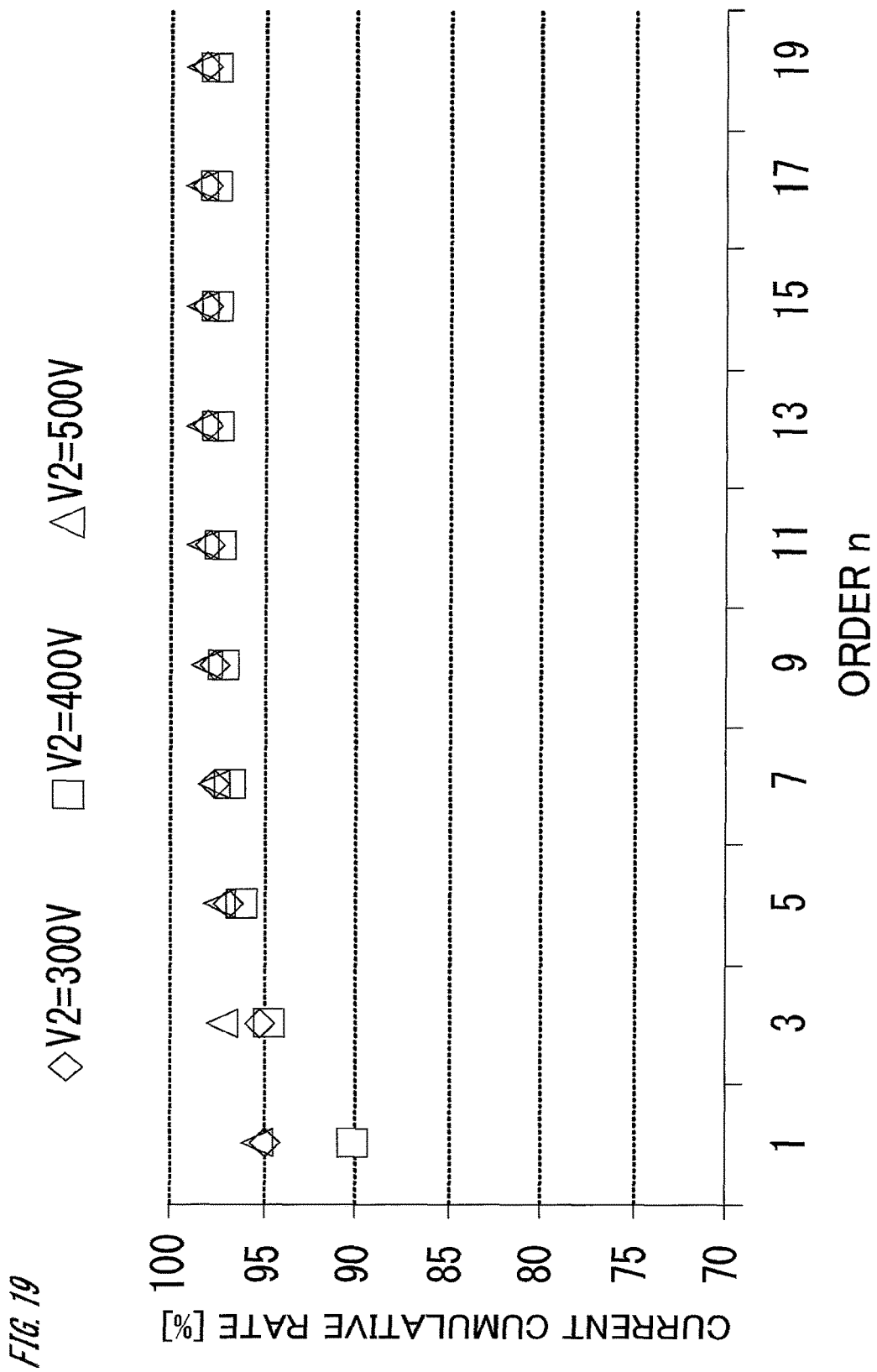
FIG. 19 is a characteristic diagram showing a current cumulative rate with respect to a current flowing through the charging/discharging capacitor according to Embodiment 2 of the invention.

FIG. 19 is a characteristic diagram showing a current cumulative rate of components up to each order harmonic component in the current flowing through the charging/discharging capacitor C0. The condition is V1=200V and I1=100 A.

Here, the current cumulative rate of components up to an n-th order harmonic component in Ic0(rms), namely, the current cumulative rate of the first order to n-th order harmonic components, is represented by a formula (19). Note that n denotes an odd number.

[Mathematical 8]

$$\frac{\sum_{k=1}^{(n+1)/2}(Ic0(\text{rms}) - (2k-1))}{Ic0(\text{rms})}\times 100 \quad (19)$$

As shown in FIG. 19, in any of cases of V2=300V, 400V and 500V, with respect to Ic0(rms), 95% or more of all current components are included in the harmonic components of from the first order (fundamental-wave component) to the fifth order. Namely, in the current flowing through the charging/discharging capacitor C0, the harmonic components of from the first order to the fifth order (fundamental-wave component and third order & fifth order harmonic components) can be said to be dominant, thus resulting in a saturated state of the current cumulative rate.

Figure 20:
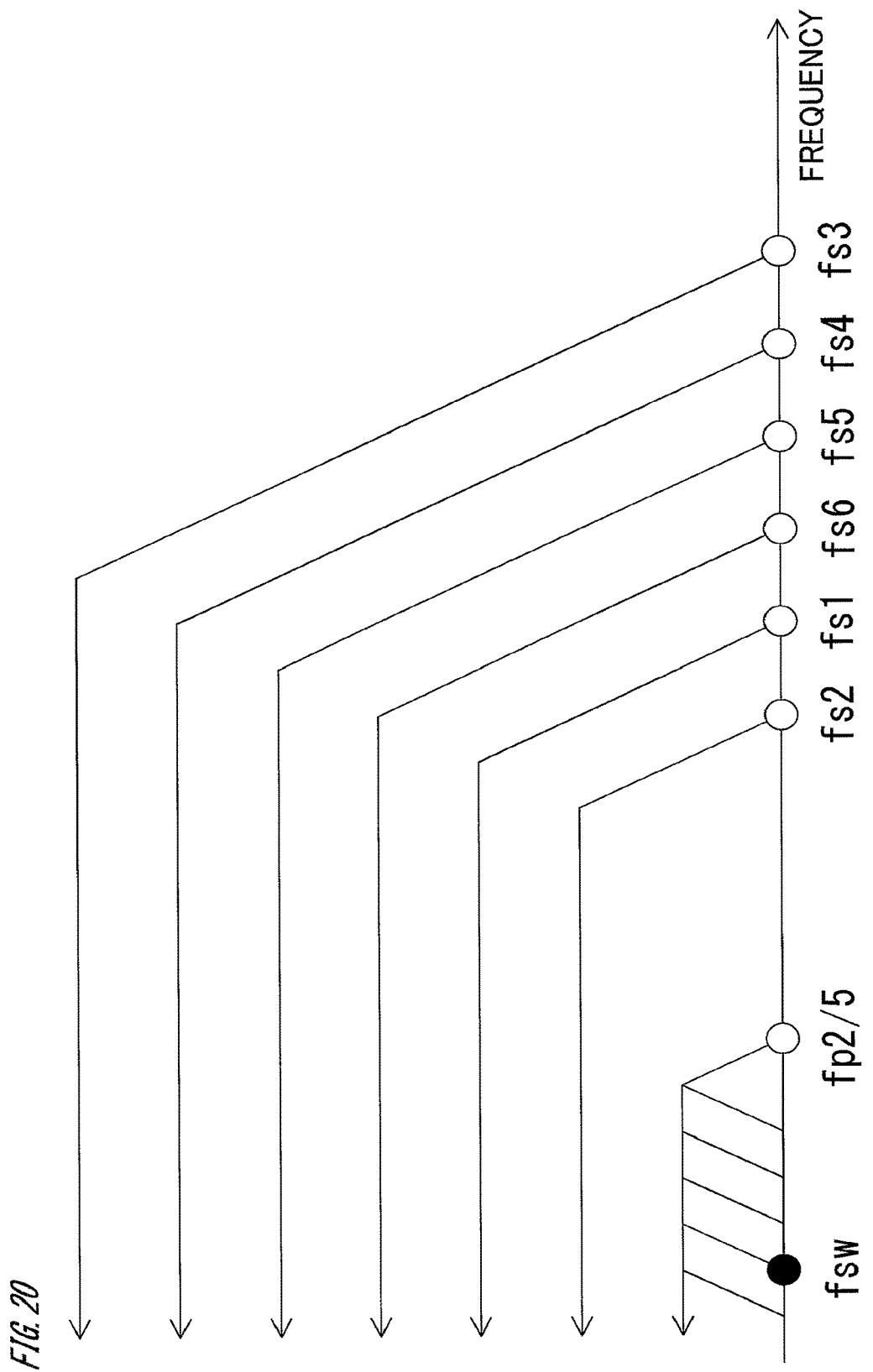
FIG. 20 is a brief diagram for illustrating a carrier frequency according to Embodiment 2 of the invention.

FIG. 20 is a brief diagram for illustrating how to set the carrier frequency fsw.

As described previously, in order to cause the respective first to sixth capacitor elements in the high-voltage side capacitor C2, the low-voltage side capacitor C1 and the charging/discharging capacitor C0, to function each as a capacitor, the frequency fsw for switching is set to be less than the series resonance frequencies fs1 to fs6 of all capacitor elements (first to sixth capacitor elements).

Further, the carrier frequency fsw is set so that: the fundamental-wave component and third order & fifth order harmonic components in Ic0(rms) each have a frequency that is lower than the parallel resonance frequency fp2 of the charging/discharging capacitor C0 at which the ESR takes a maximum value; and furthermore, the frequencies of the harmonic components in Ic0(rms) do not overlap with the parallel resonance frequency fp2. Namely, the carrier frequency fsw is set so that it is lower than one-fifth of the parallel resonance frequency fp2 of the charging/discharging capacitor C0 and its odd multiples are each not equal to the parallel resonance frequency fp2. Note that the thus-set carrier frequency fsw is stored in the storage 45b.

When an n-th order harmonic component of the ESR in the charging/discharging capacitor C0 is defined as Rc0-n, a total loss Pc0-n due to the odd order harmonic components of from the first order to n-th order (n denotes an odd number), in the charging/discharging capacitor C0, is represented by a formula (20).

[Mathematical 9]

$$Pc0 - n = \sum_{k=1}^{(n+1)/2} ((Rc0 - (2k-1)) \times (Ic0(\text{rms}) - (2k-1))^2) \quad (20)$$

Since the carrier frequency fsw is set so that its odd multiple are each not equal to the parallel resonance frequency fp2 of the charging/discharging capacitor C0, the frequencies of the harmonic components in the current Ic0(rms) flowing through the charging/discharging capacitor C0 do not overlap with the parallel resonance frequency fp2. Thus, it is possible to prevent the respective harmonic components of the ESR in the charging/discharging capacitor C0 from reaching their maximum values.

Moreover, since the carrier frequency fsw is set to a value that is less than (fp2/5), the respective (Rc0-1), (Rc0-3) and (Rc2-5) that are ESRs corresponding to the fundamental-wave component and third order & fifth order harmonic components that are dominant in the current Ic2(rms) flowing through the charging/discharging capacitor C0, can be surely prevented from reaching their maximum values and can be set to relatively small values within less than the maximum values.

For these reasons, it is possible to suppress the loss in the charging/discharging capacitor C0 represented by the formula (20).

As described above, in the power conversion device 5a according to Embodiment 2, the carrier frequency (switching frequency) fsw for driving the switching elements S1 to S4 is set so that: it is less than the series resonance frequencies fs1 to fs6 of the first to sixth capacitor elements that are all capacitor elements in the low-voltage side capacitor C1, the high-voltage side capacitor C2 and the charging/discharging capacitor C0; and furthermore, it is less than one-fifth of the parallel resonance frequency fp2 of the charging/discharging capacitor C0, and odd multiples of the carrier frequency fsw are each not equal to the parallel resonance frequency fp2.

Thus, it is possible to suppress the loss caused by the ESR that increases due to parallel resonance of the charging/discharging capacitor C0 and by the harmonic currents, to thereby reduce the loss in the charging/discharging capacitor C0 produced due to control of the switching elements S1 to S4.

Further, since the current flowing through the charging/discharging capacitor C0 is larger than the currents flowing through the low-voltage side capacitor C1 and the high-voltage side capacitor C2, the loss reduction effect is significant.

Further, when the carrier frequency fsw is set in the above manner, the loss due to parallel resonance of the charging/discharging capacitor C0 can be reduced, so that it is possible to improve the power conversion efficiency of the power conversion device 5a, and to suppress temperature rise of the charging/discharging capacitor C0 to thereby improve the reliability as well. In addition, such a loss reduction and temperature-rise suppression effect for the charging/discharging capacitor C0 can be achieved without requiring increase of the capacity of the charging/discharging capacitor C0 and expansion of its cooling structure. This makes it possible to accomplish downsizing of the device configuration and cost reduction.

It is noted that, in the above embodiment, the carrier frequency fsw is set to be less than one-fifth of the parallel resonance frequency fp2 of the charging/discharging capacitor C0; however, it may be set to be lower than a value (fp2/N) resulting from dividing the parallel resonance frequency fp2 by an order N that is determined so that the current cumulative rate with respect to the current flowing through the charging/discharging capacitor C0 reaches its saturated state with the fundamental-wave component and the harmonic components of up to the order N.

Further, the order for dividing the parallel resonance frequency fp2 may instead be an order that is lower than the order with which the saturated state is given. Even in that case, since the carrier frequency fsw is set so that it is less than the series resonance frequencies fs1 to fs4 of the first to sixth capacitor elements, and its odd multiples are each not equal to the parallel resonance frequency fp2, there is provided an effect of reducing the loss due to parallel resonance, in the charging/discharging capacitor C0.

Furthermore, the high-voltage side capacitor C2, the low-voltage side capacitor C1 and the charging/discharging capacitor C0 are each configured with two capacitor elements connected in parallel to each other; however, it may be configured with three or more capacitor elements connected in parallel to each other, and the number of parallel capacitor elements may differ among these capacitors.

When three or more capacitor elements are connected in parallel to each other in the charging/discharging capacitor C0, two or more parallel resonance frequencies may arise in some cases, so that the carrier frequency used for controlling the switching elements S1 to S4 is given as a value that is less than one-fifth of the lowest parallel resonance frequency.

Further, in Embodiment 2, the power conversion device 5a is provided as an MLC circuit of a bidirectional type capable of converting power bidirectionally; however, it may be configured to convert power unidirectionally from the low-voltage side to the high-voltage side in such a manner, for example, that diodes are used as the third and fourth semiconductor elements in place of the switching elements S3, S4, and this provides a similar effect when the carrier frequency fsw is set similarly.

Embodiment 3

Next, a power conversion device according to Embodiment 3 of the invention will be described based on drawings as follows.

Figure 21:
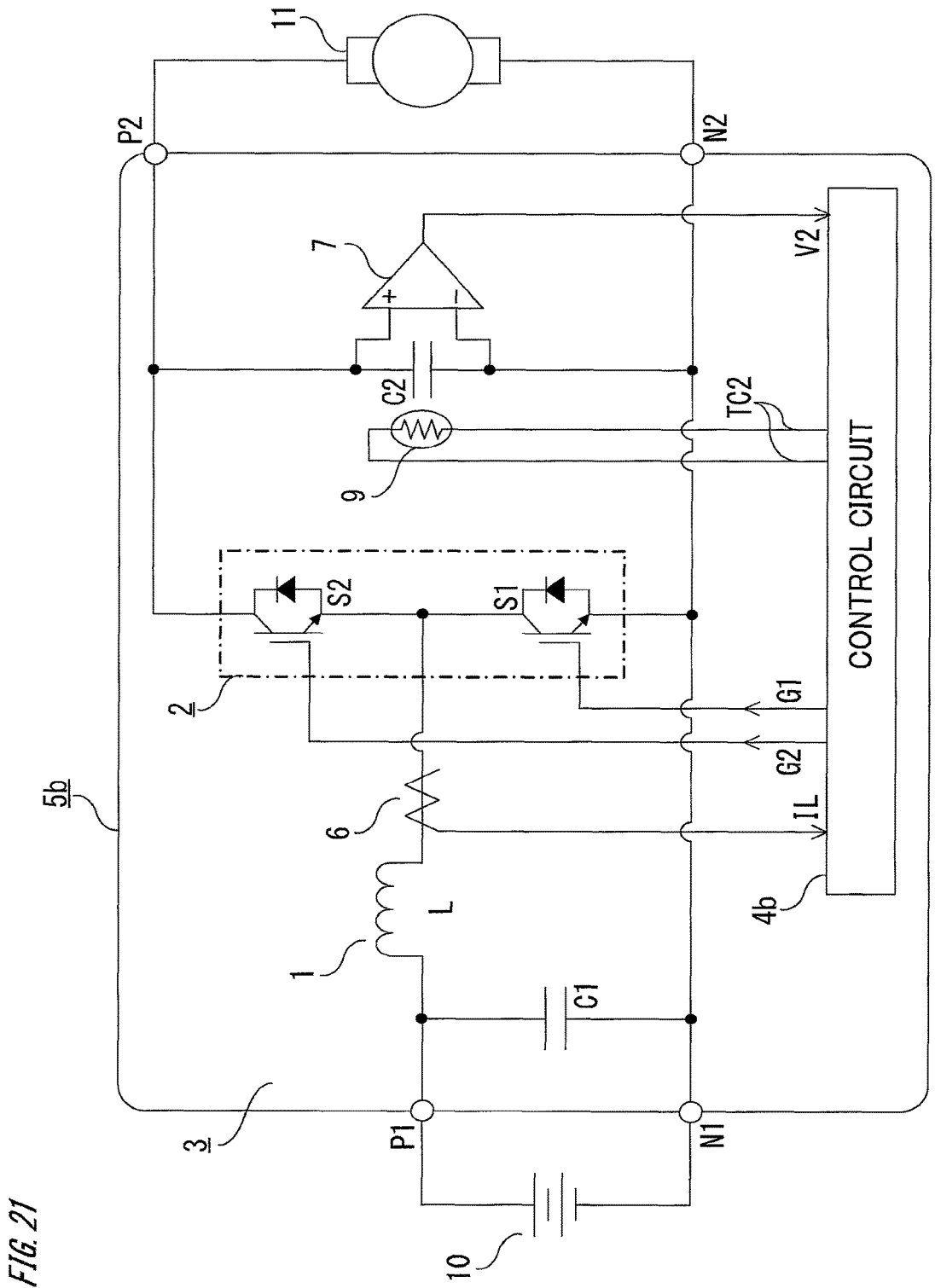
FIG. 21 is a diagram showing a circuit configuration of a power conversion device according to Embodiment 3 of the invention.

FIG. 21 is a diagram showing a circuit configuration of a power conversion device 5b according to Embodiment of the invention. As shown in FIG. 21, the power conversion device 5b is configured by providing in the power conversion device 5 shown in FIG. 1 of Embodiment 1, a thermistor 9 for detecting the temperature of the high-voltage side capacitor C2. Further, the control circuit 4b generates gate signals G1, G2 for the respective switching elements S1, S2, according to a detection value (IL) of the current sensor 6, a detection value (V2) of the voltage sensor 7 and a detection value (TC2) of the thermistor 9, to thereby cause each of the switching elements S1, S2 to perform ON/OFF operation.

The other configuration is similar to that in Embodiment 1, so that its description is omitted here.

Figure 22:
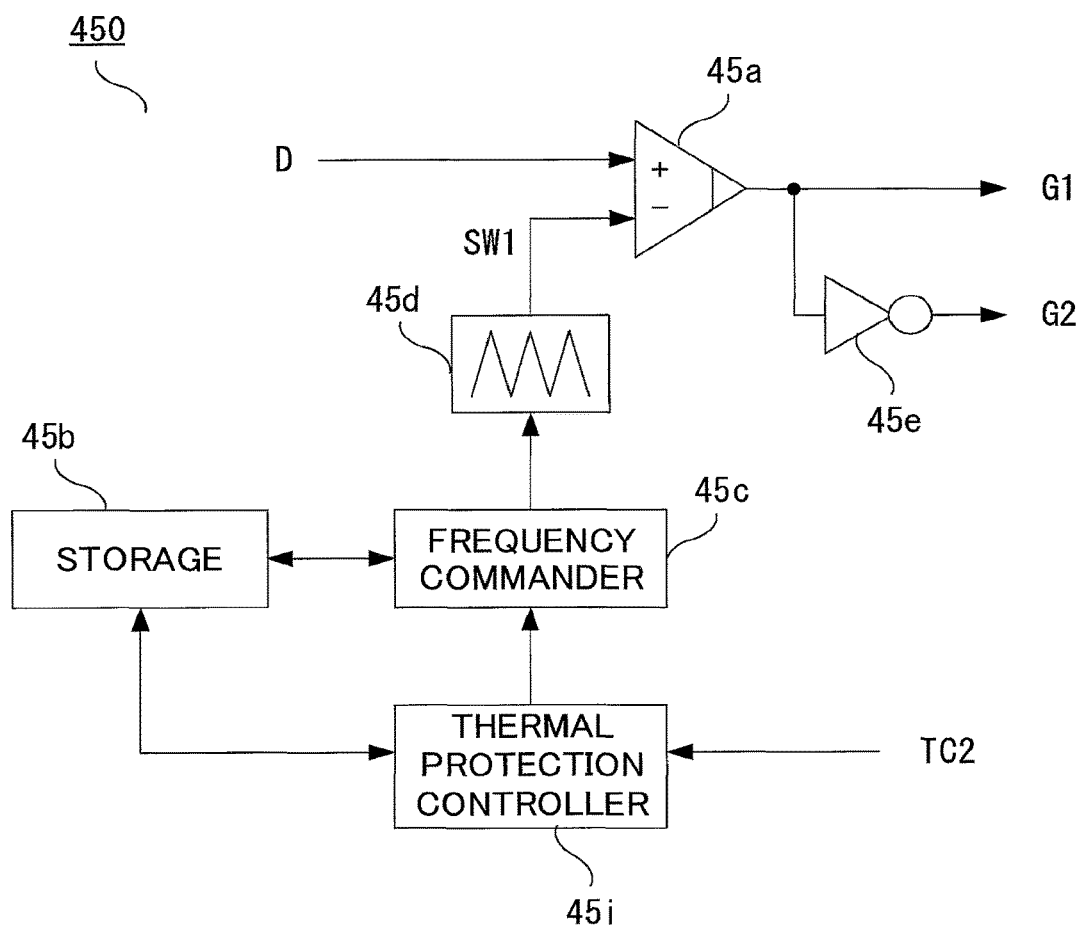
FIG. 22 is a block diagram showing details of a first control block according to Embodiment 3 of the invention.

The control circuit 4b has a configuration similar to that shown in FIG. 4 of Embodiment 1; however, in this case, a first control block 450 in the control circuit 4b differs from the first control block 45 in Embodiment 1, and thus, details thereof is shown in FIG. 22.

As shown in FIG. 22, the first control block 450 is configured by adding to the first control block 45 shown in FIG. 5 of Embodiment 1, a thermal protection controller 45i.

Further, in the storage 45b, there are stored: a carrier frequency fsw1 as a preset frequency used at the time of normal operation (hereinafter, referred to as a normal frequency); a carrier frequency fsw2 used at the time of thermally-protective operation (hereinafter, referred to as a protective frequency); and a temperature threshold value (Tth1) for protecting the high-voltage side capacitor C2.

Note that the normal frequency fsw1 is set similarly to the carrier frequency fsw used in Embodiment 1. Further, a relationship of fsw1>fsw2 is established and, for example, fsw2=fsw1/2 is given.

The first control block 450 is a block for generating PWM signals (gate signals G1, G2).

The thermal protection controller 45i compares the temperature TC2 of the high-voltage side capacitor C2 detected by the thermistor 9 with the referenced temperature threshold value Tth1 from the storage 45b, and outputs a temperature-rise detection signal when TC2 Tth1. Based on the output from the thermal protection controller 45i, the frequency commander 45c refers to the normal frequency fsw1 or the protective frequency fsw2 stored in the storage 45b, to thereby instruct the carrier signal generator 45d to generate a carrier signal with the frequency fsw1 (or fsw2). The carrier signal generator 45d uses the normal frequency fsw1 at the time of normal operation, and uses the protective frequency fsw2 when TC2≥Tth1, to thereby generate a first triangular wave SW1 as the carrier signal. The duty ratio D outputted through the limiter 44 and the first triangular wave SW1 are inputted to the comparator 45a and are then mutually compared, so that the gate signal G1 for the switching element S1 is generated. Further, the inverter 45e inverts the gate signal G1 to thereby output the gate signal G2 for the switching element S2.

In this embodiment, when the temperature TC2 of the high-voltage side capacitor C2 rises to reach the temperature threshold value Tth1 or more, the frequency is switched to the protective frequency fsw2 lower than the normal frequency fsw1. This makes it possible to reduce the ESRs corresponding to the first order (fundamental-wave component) to fifth order harmonic components that are dominant in the effective value Ic2(rms) of the current flowing through the high-voltage side capacitor C2, as compared with those at the time of normal operation. Accordingly, the loss in the high-voltage side capacitor C2 represented by the formula (12) can be further suppressed. Note that, when TC2<Tth1 is then given, the output of the thermal protection controller 45i returns to its initial state, so that the carrier signal generator 45d generates the first triangular wave SW1 by using the normal frequency fsw1 for normal operation.

According to Embodiment 3, an effect similar to in Embodiment 1 is achieved, and in addition, the temperature rise of the high-voltage side capacitor C2 can be surely suppressed because the switching frequency is switched upon detection of the actual temperature of the high-voltage side capacitor C2. Further, when the temperature rise is detected, the frequency is switched to the protective frequency fsw2 lower than the normal frequency fsw1, so that it is possible to further suppress the loss caused by the ESR that increases due to parallel resonance of the high-voltage side capacitor C2 and by the harmonic currents.

Note that, when the protective frequency fsw2 is set so that its integer multiples are each not equal to the parallel resonance frequency fp1 of the high-voltage side capacitor C2, it is possible to more surely achieve an effect of reducing the loss that increases due to parallel resonance in the high-voltage side capacitor C2.

Further, in this embodiment, although the invention is applied to the SPC circuit shown in Embodiment 1, it may be applied similarly to the MLC circuit according to Embodiment 2. In that case, the thermistor is added to the charging/discharging capacitor C0, the detected temperature of the charging/discharging capacitor C0 is compared with a temperature threshold value and, based on the comparison result, the carrier frequency for controlling the switching elements S1 to S4 is switched. This makes it possible to further reduce the loss caused by the ESR that increases due to parallel resonance of the charging/discharging capacitor C0 and by the harmonic currents.

Embodiment 4

Next, a power conversion device according to Embodiment 4 of the invention will be described based on drawings as follows.

Figure 23:
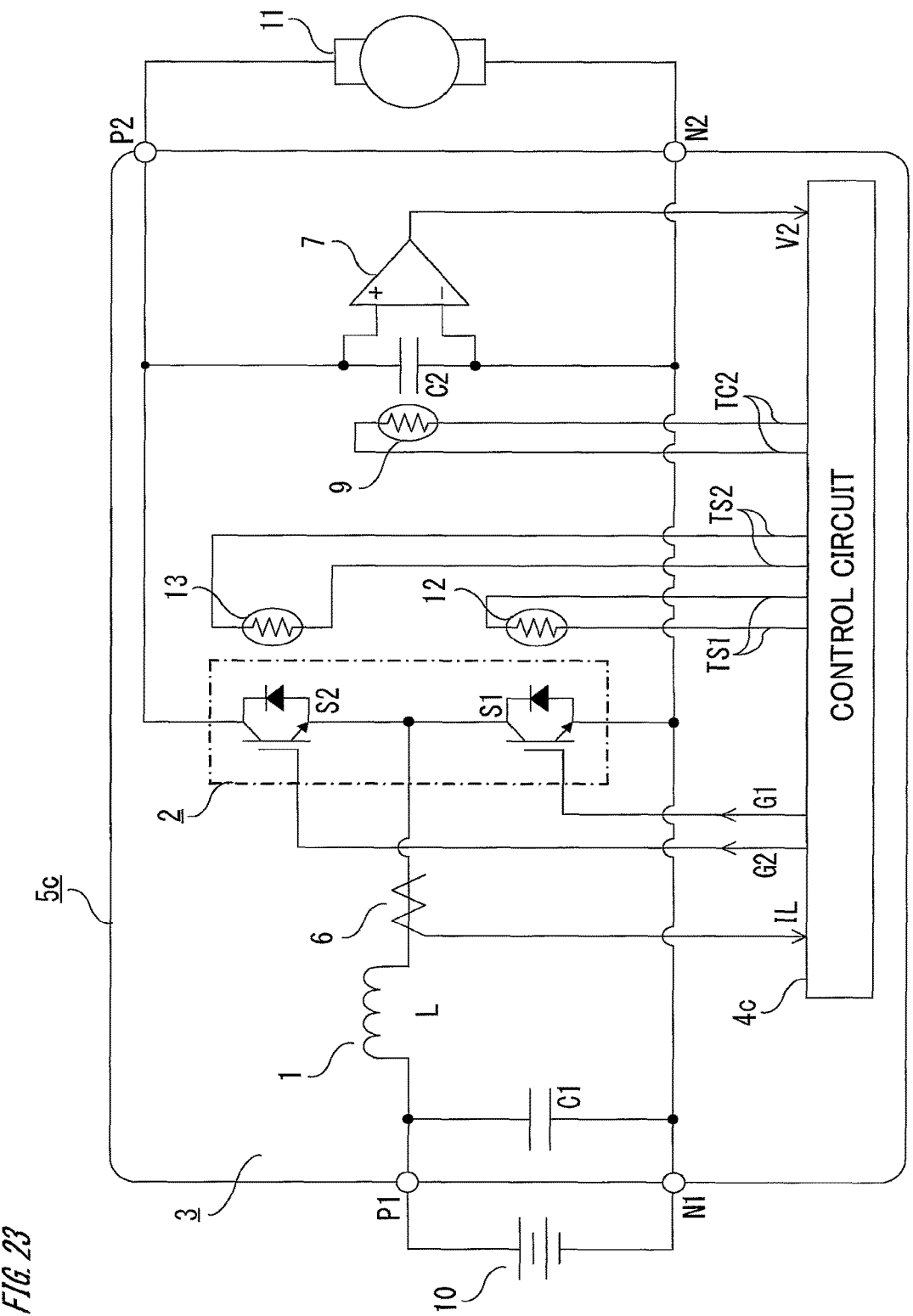
FIG. 23 is a diagram showing a circuit configuration of a power conversion device according to Embodiment 4 of the invention.

FIG. 23 is a diagram showing a circuit configuration of a power conversion device 5c according to Embodiment of the invention. As shown in FIG. 23, the power conversion device 5c is configured by providing in the power conversion device 5 shown in FIG. 1 of Embodiment 1, a thermistor 9 for detecting the temperature of the high-voltage side capacitor C2, a thermistor 12 for detecting the temperature of the switching element S1, and a thermistor 13 for detecting the temperature of the switching element S2. Further, the control circuit 4c generates gate signals G1, G2 for the respective switching elements S1, S2, according to a detection value (IL) of the current sensor 6, a detection value (V2) of the voltage sensor 7 and detection values (TC2, TS1, TS2) of the thermistors 9, 12, 13, to thereby cause each of the switching elements S1, S2 to perform ON/OFF operation.

The other configuration is similar to that in Embodiment 1, so that its description is omitted here.

Figure 24:
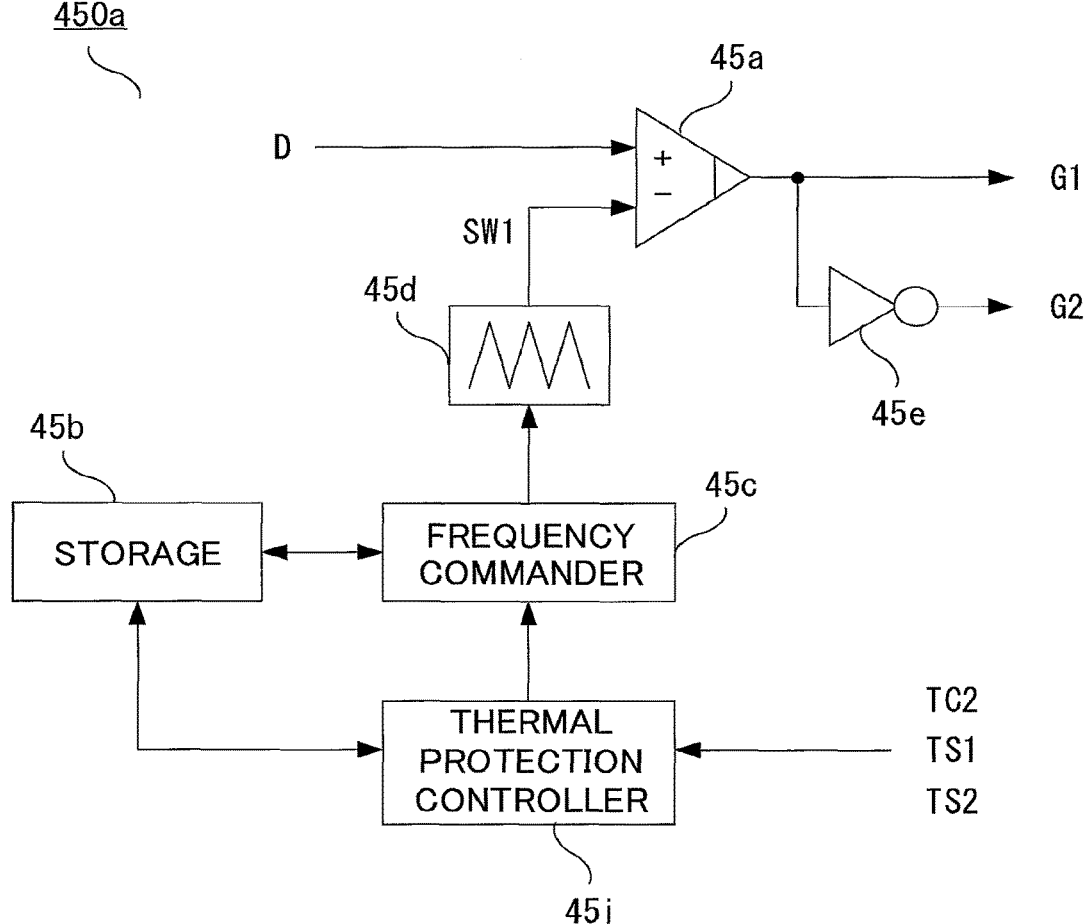
FIG. 24 is a block diagram showing details of a first control block according to Embodiment 4 of the invention.

The control circuit 4c has a configuration similar to that shown in FIG. 4 of Embodiment 1; however, in this case, a first control block 450a in the control circuit 4c differs from the first control block 45 in Embodiment 1, and thus, details thereof is shown in FIG. 24.

As shown in FIG. 24, the first control block 450a is configured by adding to the first control block 45 shown in FIG. 5 of Embodiment 1, a thermal protection controller 45i. Further, in the storage 45b, there are stored: two carrier frequencies fsw1, fsw3 as preset frequencies; a first threshold value (Tth1) as a temperature threshold value for protecting the high-voltage side capacitor C2; and a second threshold value (Tth2) as a temperature threshold value for protecting the switching elements S1, S2. Note that the carrier frequency fsw1 (hereinafter, referred to as a normal frequency) serving as a first frequency at the time of normal operation, and the carrier frequency fsw3 (hereinafter, referred to as a low-ripple frequency) serving as a second frequency at the time of low-ripple operation to be described later, satisfy a relationship of fsw1<fsw3.

It is noted that the normal frequency fsw1 and the low-ripple frequency fsw3 are each set similarly to the carrier frequency fsw used in Embodiment 1. Namely, the normal frequency fsw1 and the low-ripple frequency fsw3 are set so that: they are each less than the series resonance frequencies fs1 to fs4 of the first to fourth capacitor elements that are all capacitor elements in the low-voltage side capacitor C1 and the high-voltage side capacitor C2; and furthermore, they are each less than one-fifth of the parallel resonance frequency fp1 of the high-voltage side capacitor C2, and integer multiples (odd multiples and even multiples)

of the carrier frequencies fsw1, fsw3 are each not equal to the parallel resonance frequency fp1.

The first control block 450a is a block for generating PWM signals (gate signals G1, G2).

The temperature TC2 of the high-voltage side capacitor C2 and the temperatures TS1, TS2 of the switching elements S1, S2, that have been detected by the thermistors 9, 12, 13, are inputted to the thermal protection controller 45i. Then, the thermal protection controller 45i compares the temperature TC2 of the high-voltage side capacitor C2 with the referenced first threshold value Tth1 from the storage 45b, and compares each of the temperatures TS1, TS2 of the switching elements S1, S2 with the referenced second threshold Tth2 from the storage 45b. When the conditions of TC2<Tth1, TS1<Tth2 and TS2<Tth2 are all satisfied, the frequency commander 45c is instructed to refer to the low-ripple frequency fsw3 stored in the storage 45b. Based on the output from the thermal protection controller 45i, the frequency commander 45c refers to the normal frequency fsw1 or the low-ripple frequency fsw3 stored in the storage 45b, to thereby instruct the carrier signal generator 45d to generate a carrier signal with the frequency fsw1 (or fsw3).

The carrier signal generator 45d uses the normal frequency fsw1 when TC2≥Tth1 or TS1≥Tth2 or TS2≥Tth2, and uses the low-ripple frequency fsw3 when TC2<Tth1 and TS1<Tth2 and TS2<Tth2, to thereby generate a first triangular wave SW1 as the carrier signal. The duty ratio D outputted through the limiter 44 and the first triangular wave SW1 are inputted to the comparator 45a and are then mutually compared, so that the gate signal G1 for the switching element S1 is generated. Further, the inverter 45e inverts the gate signal G1 to thereby output the gate signal G2 for the switching element S2.

Here, an effective value Ic1(rms) of the current flowing through the low-voltage side capacitor C1 is represented by a formula (21), using a switching period Tsw, a turn-on time Ton of the switching element S1 and a ripple component ΔIL in the current flowing through the reactor 1.

[Mathematical 10]

$$Ic1(\text{rms}) = \sqrt{\frac{1}{Tsw}\left[\int_{-Ton}^{0}\left(\frac{\Delta IL}{Ton}\cdot t + \frac{\Delta IL}{2}\right)^2 dt + \int_{0}^{Tsw-Ton}\left(-\frac{\Delta IL}{Tsw-Ton}\cdot t + \frac{\Delta IL}{2}\right)^2 dt\right]} \quad (21)$$
$$= \frac{\Delta IL}{2\sqrt{3}}$$

included in the current Ic1 flowing through the low-voltage side capacitor C1. When an n-th order harmonic component of the ESR in the low-voltage side capacitor C1 is defined as Rc1-n, and an n-th order harmonic component in the current flowing through the low-voltage side capacitor C1 is defined as Ic1(rms)-n, a total loss Pc1-n due to the harmonic components of from the first order (fundamental-wave component) to n-th order, in the low-voltage side capacitor C1, is represented by a formula (22). Note that n is assumed to be an odd number.

[Mathematical 11]

$$Pc1 - n = \sum_{k=1}^{(n+1)/2}((Rc1-(2k-1))\times(Ic1(\text{rms})-(2k-1))^2) \quad (22)$$

Further, an effective value IL(rms) of the current flowing through the reactor 1 is represented by a formula (23), using a DC current I1 flowing through the reactor 1 and a ripple component ΔIL in the current flowing through the reactor 1.

[Mathematical 12]

$$IL(\text{rms}) = \sqrt{I1^2 + Ic1(\text{rms})^2} \quad (23)$$
$$= \sqrt{I1^2 + \frac{\Delta IL^2}{12}}$$

Then, when a DC resistance of the reactor 1 is defined as RL-0, a DC current flowing through the reactor 1 is defined as I1, an n-th order harmonic component of the ESR in the reactor 1 is defined as RL-n, and an n-th order harmonic component in the current flowing through the reactor 1 is defined as IL(rms)-n, a total copper loss PL-n due to the harmonic components of from the first order (fundamental-wave component) to the n-th order, in the reactor 1, is represented by a formula (24). Note that n is assumed to be an odd number.

[Mathematical 13]

$$PL - n = RL \times I1^2 + \sum_{k=1}^{(n+1)/2}((RL-(2k-1))\times(IL(\text{rms})-(2k-1))^2) \quad (24)$$

In this embodiment, when the temperature TC2 of the high-voltage side capacitor C2, and the temperatures TS1, TS2 of the switching elements S1, S2 are all less than their preset threshold values, namely, when TC2<Tth1 and TS1<Tth2 and TS2<Tth2, the frequency is switched to the low-ripple frequency fsw3 higher than the normal frequency fsw1.

This makes possible a low-ripple operation in which the ripple component ΔIL represented by the formula (10) in the current flowing through the reactor 1 is decreased. Further, though depending on the values of the respective resistance values Rc1-n, Rc2-n, RL-n, it is possible to further reduce the loss in the high-voltage side capacitor C2 represented by the formula (12), the loss in the low-voltage side capacitor C1 represented by the formula (22), and the copper loss in the reactor 1 represented by the formula (24).

As described above, according to this embodiment, an effect similar to in Embodiment 1 is achieved, and in addition, the ripple component in the current flowing through the reactor 1 can be decreased. Further, though depending on the values of the harmonic component of the ESR in the reactor 1, the harmonic component of the ESR in the low-voltage side capacitor C1 and the harmonic component of the ESR in the high-voltage side capacitor C2, it is possible to further reduce the losses in the reactor 1, the low-voltage side capacitor C1 and the high-voltage side capacitor C2. Further, because the ripple component in the current flowing through the reactor 1 is decreased, the losses in the switching elements S1 to S4 can be reduced. For these reasons, it is possible to achieve loss reduction and downsizing of the power conversion device 5c to more extent.

It is noted that, in this embodiment, although the invention is applied to the SPC circuit shown in Embodiment 1, it may be similarly applied to the MLC circuit according to Embodiment 2. In that case, the thermistors are added to the charging/discharging capacitor C0 and the respective switching elements S1 to S4, the respective detected temperatures are compared with their respective temperature threshold values and, based on the comparison results, the carrier frequency for controlling the switching elements S1 to S4 is switched. This makes it possible, even in the MLC circuit according to Embodiment 2, to decrease the ripple component in the current flowing through the reactor 1. Further, though depending on the values of the harmonic component of the ESR in the reactor 1, the harmonic component of the ESR in the low-voltage side capacitor C1 and the harmonic component of the ESR in the high-voltage side capacitor C2, it is possible to further reduce the losses in the reactor 1, the low-voltage side capacitor C1 and the high-voltage side capacitor C2. Further, because the ripple component in the current flowing through the reactor 1 is decreased, the losses in the switching elements S1 to S4 can be reduced.

Further, in Embodiments 3 and 4, the thermistors 9, 12, 13 are used for temperature detection; however, another temperature detection means, such as a thermocouple, a diode or the like, may instead be applied for temperature detection.

Furthermore, in Embodiments 3 and 4, it is shown that the carrier frequency is switched depending on the temperature of the high-voltage side capacitor C2; however, the carrier frequency may, of course, be switched depending on the temperature of the capacitor element or the bus bar that form the high-voltage side capacitor C2.

It is noted that, in each of the foregoing embodiments, the description has been made citing a case where the switching elements are each configured with an IGBT and a diode connected in reverse parallel thereto; however, an MOSFET, a JFET or the like, may be used in place of the IGBT. When the MOSFET is used, in place of the diode, a body diode of the MOSFET may be utilized. Further, the respective semiconductor elements including the switching elements may be each formed of a wide bandgap semiconductor whose bandgap is wider than that of silicon, for example, silicon carbide (SiC), a gallium nitride-based material, diamond.

It is further noted that unlimited combination of the respective embodiments, and appropriate modification or omission in the embodiments may be made in the present invention without departing from the scope of the invention.

The invention claimed is:

1. A power conversion device, comprising:
a DC/DC converter having plural semiconductor elements to be rendered conductive or cut off, a reactor, and plural capacitors in each of which plural capacitor elements are connected in parallel to each other; and
a control circuit for controlling the DC/DC converter;
wherein at least a part of the plural semiconductor elements comprises a switching element(s);
wherein the control circuit controls driving of the switching element(s) at a preset frequency; and
wherein the preset frequency is less than series resonance frequencies of all of the plural capacitor elements in the plural capacitors, and is lower than a value (fp/N) that is resulting from dividing a parallel resonance frequency fp of the plural capacitor elements in a first capacitor as one of the plural capacitors, by an order N that is determined based on harmonic currents flowing through the first capacitor, and further, integer multiples of the preset frequency are each not equal to the parallel resonance frequency fp.

2. The power conversion device of claim 1, wherein a current flowing through the first capacitor is largest among currents flowing through the plural capacitors, and a cumulative rate with respect to the current flowing through the first capacitor reaches its saturated state with a fundamental-wave current and harmonic currents of up to the order N.

3. The power conversion device of claim 2, wherein the DC/DC converter includes:
as the plural capacitors, a low-voltage side capacitor and a high-voltage side capacitor provided as the first capacitor; and further,
as the plural semiconductor elements, a first semiconductor element whose first end is connected to a negative electrode of the low-voltage side capacitor and whose second end is connected through the reactor to a positive electrode of the low-voltage side capacitor, and a second semiconductor whose one end is connected to the second end of the first semiconductor element and whose second end is connected to a positive electrode of the high-voltage side capacitor;
wherein, in the first and second semiconductor elements, at least the first semiconductor element is said switching element; and
wherein the integer multiples of the preset frequency are each not equal to the parallel resonance frequency fp.

4. The power conversion device of claim 2, wherein the DC/DC converter includes:
as the plural capacitors, a low-voltage side capacitor, a high-voltage side capacitor and a charging/discharging capacitor provided as the first capacitor; and further,
as the plural semiconductor elements, a first semiconductor element whose first end is connected to a negative electrode of the low-voltage side capacitor, a second semiconductor element whose first end is connected to a second end of the first semiconductor element and whose second end is connected through the reactor to a positive electrode of the low-voltage side capacitor, a third semiconductor element whose first end is connected to the second end of the second semiconductor element, and a fourth semiconductor element whose first end is connected to a second end of the third semiconductor element and whose second end is connected to a positive electrode of the high-voltage side capacitor;
wherein, in the first to fourth semiconductor elements, at least the first and second semiconductor elements are said switching elements;
wherein the charging/discharging capacitor is connected between a connection point between the first and second semiconductor elements and a connection point between the third and fourth semiconductor elements; and
wherein odd multiples of the preset frequency are each not equal to the parallel resonance frequency fp.

5. The power conversion device of claim 2, wherein the order N determined is 5, and the preset frequency is lower than one-fifth of the parallel resonance frequency fp.

6. The power conversion device of claim 2, comprising a temperature detection unit for detecting a temperature of the first capacitor,
wherein the control circuit controls driving of the switching element(s) by switching to a frequency that is lower than the preset frequency, when the temperature of the first capacitor reaches a preset threshold value or more.

7. The power conversion device of claim 2, comprising a first temperature detection unit for detecting a temperature of the first capacitor, and a second temperature detection unit for detecting a temperature of the switching element, wherein the control circuit has a first frequency and a second frequency higher than the first frequency, each as the preset frequency; and the control unit controls driving of the switching element using the first frequency when at least one of the conditions is satisfied that the temperature of the first capacitor is a first preset threshold value or more, and that the temperature of the switching element is a second preset threshold value or more; and controls driving of the switching element by switching to the second frequency, when the temperature of the first capacitor becomes less than the first preset threshold value and the temperature of the switching element becomes less than the second preset threshold value.

8. The power conversion device of claim 2, wherein the plural semiconductor elements are made of a wide bandgap semiconductor material whose bandgap is wider than that of silicon.

9. The power conversion device of claim 1, wherein the DC/DC converter includes:
as the plural capacitors, a low-voltage side capacitor and a high-voltage side capacitor provided as the first capacitor; and further,
as the plural semiconductor elements, a first semiconductor element whose first end is connected to a negative electrode of the low-voltage side capacitor and whose second end is connected through the reactor to a positive electrode of the low-voltage side capacitor, and a second semiconductor whose one end is connected to the second end of the first semiconductor element and whose second end is connected to a positive electrode of the high-voltage side capacitor;
wherein, in the first and second semiconductor elements, at least the first semiconductor element is said switching element; and
wherein the integer multiples of the preset frequency are each not equal to the parallel resonance frequency fp.

10. The power conversion device of claim 9, wherein the order N determined is 5, and the preset frequency is lower than one-fifth of the parallel resonance frequency fp.

11. The power conversion device of claim 9, comprising a temperature detection unit for detecting a temperature of the first capacitor,
wherein the control circuit controls driving of the switching element(s) by switching to a frequency that is lower than the preset frequency, when the temperature of the first capacitor reaches a preset threshold value or more.

12. The power conversion device of claim 9, comprising a first temperature detection unit for detecting a temperature of the first capacitor, and a second temperature detection unit for detecting a temperature of the switching element, wherein
the control circuit has a first frequency and a second frequency higher than the first frequency, each as the preset frequency; and
the control unit controls driving of the switching element using the first frequency when at least one of the conditions is satisfied that the temperature of the first capacitor is a first preset threshold value or more, and that the temperature of the switching element is a second preset threshold value or more; and controls driving of the switching element by switching to the second frequency, when the temperature of the first capacitor becomes less than the first preset threshold value and the temperature of the switching element becomes less than the second preset threshold value.

13. The power conversion device of claim 9, wherein the plural semiconductor elements are made of a wide bandgap semiconductor material whose bandgap is wider than that of silicon.

14. The power conversion device of claim 1, wherein the DC/DC converter includes:
as the plural capacitors, a low-voltage side capacitor, a high-voltage side capacitor and a charging/discharging capacitor provided as the first capacitor; and further,
as the plural semiconductor elements, a first semiconductor element whose first end is connected to a negative electrode of the low-voltage side capacitor, a second semiconductor element whose first end is connected to a second end of the first semiconductor element and whose second end is connected through the reactor to a positive electrode of the low-voltage side capacitor, a third semiconductor element whose first end is connected to the second end of the second semiconductor element, and a fourth semiconductor element whose first end is connected to a second end of the third semiconductor element and whose second end is connected to a positive electrode of the high-voltage side capacitor;
wherein, in the first to fourth semiconductor elements, at least the first and second semiconductor elements are said switching elements;
wherein the charging/discharging capacitor is connected between a connection point between the first and second semiconductor elements and a connection point between the third and fourth semiconductor elements; and
wherein odd multiples of the preset frequency are each not equal to the parallel resonance frequency fp.

15. The power conversion device of claim 14, wherein the order N determined is 5, and the preset frequency is lower than one-fifth of the parallel resonance frequency fp.

16. The power conversion device of claim 1, wherein the order N determined is 5, and the preset frequency is lower than one-fifth of the parallel resonance frequency fp.

17. The power conversion device of claim 1, comprising a temperature detection unit for detecting a temperature of the first capacitor,
wherein the control circuit controls driving of the switching element(s) by switching to a frequency that is lower than the preset frequency, when the temperature of the first capacitor reaches a preset threshold value or more.

18. The power conversion device of claim 1, comprising a first temperature detection unit for detecting a temperature of the first capacitor, and a second temperature detection unit for detecting a temperature of the switching element, wherein
the control circuit has a first frequency and a second frequency higher than the first frequency, each as the preset frequency; and
the control unit controls driving of the switching element using the first frequency when at least one of the conditions is satisfied that the temperature of the first capacitor is a first preset threshold value or more, and that when the temperature of the switching element is a second preset threshold value or more; and controls driving of the switching element by switching to the second frequency, when the temperature of the first capacitor becomes less than the first preset threshold value and the temperature of the switching element becomes less than the second preset threshold value.

19. The power conversion device of claim 18, wherein the second frequency is set so as to decrease a ripple component in a current flowing through the reactor.

20. The power conversion device of claim 1, wherein the plural semiconductor elements are made of a wide bandgap semiconductor material whose bandgap is wider than that of silicon.

* * * * *